US012650689B2

(12) United States Patent
Summer et al.

(10) Patent No.:    US 12,650,689 B2
(45) Date of Patent:        Jun. 9, 2026

(54) UNIVERSAL CONTROL ARCHITECTURE FOR CONTROL OF UNMANNED SYSTEMS

(71) Applicant: Tomahawk Robotics, Inc., Melbourne, FL (US)

(72) Inventors: Matthew D. Summer, Melbourne, FL (US); William S. Bowman, Melbourne, FL (US); Andrew D. Falendysz, Grant, FL (US); Daniel R. Hedman, Palm Bay, FL (US); Brad Truesdell, Indialantic, FL (US); Jeffrey S. Cooper, Centreville, VA (US); Michael E. Bowman, Satellite Beach, FL (US); Sean Wagoner, West Melbourne, FL (US); Kevin Makovy, West Melbourne, FL (US)

(73) Assignee: Tomahawk Robotics, Inc., Melbourne, FL (US)

( * ) Notice: Subject to any disclaimer, the term of this patent is extended or adjusted under 35 U.S.C. 154(b) by 403 days.

(21) Appl. No.: 17/571,305

(22) Filed: Jan. 7, 2022

(65) Prior Publication Data

US 2022/0413490 A1      Dec. 29, 2022

Related U.S. Application Data

(60) Provisional application No. 63/215,043, filed on Jun. 25, 2021.

(51) Int. Cl.
    *G05D 1/00*        (2024.01)
    *B62D 1/28*        (2006.01)
    (Continued)

(52) U.S. Cl.
    CPC ........... *G05D 1/0027* (2013.01); *B62D 1/283* (2013.01); *G05D 1/0022* (2013.01); *G05D 1/228* (2024.01);
    (Continued)

(58) Field of Classification Search
    CPC .... B62D 1/283; G05D 1/0027; G05D 1/0022; G05D 1/228; G05D 1/40; G05D 1/229;
    (Continued)

(56) References Cited

U.S. PATENT DOCUMENTS

| | | | |
|---|---|---|---|
| 8,265,818 B2 * | 9/2012 | Allport | ............... G05D 1/0027 |
| | | | 318/568.1 |
| 9,292,015 B2 * | 3/2016 | Prieto | .................. G05B 19/409 |

(Continued)

FOREIGN PATENT DOCUMENTS

EP          3 792 726 A1      3/2021

OTHER PUBLICATIONS

Non-Final Office Action issued in co-pending U.S. Appl. No. 17/571,217 on Apr. 3, 2023 (34 pages).

(Continued)

*Primary Examiner* — Christian Chace
*Assistant Examiner* — Nicholas Stryker
(74) *Attorney, Agent, or Firm* — Perkins Coie LLP

(57)                ABSTRACT

A common command and control architecture (alternatively termed herein as a "universal control architecture") is disclosed that allows different unmanned systems, including different types of unmanned systems (e.g., air, ground, and/or maritime unmanned systems), to be controlled simultaneously through a common control device (e.g., a controller that can be an input and/or output device). The universal control architecture brings significant efficiency gains in engineering, deployment, training, maintenance, and future upgrades of unmanned systems. In addition, the disclosed common command and control architecture breaks the traditional stovepipe development involving deployment models and thus reducing hardware and software maintenance, creating a streamlined training/proficiency initiative, reducing physical space requirements for transport, and creating (Continued)

300 ⟍

Receive Inputs
305

Input Mapping
320        310

Autonomous Behaviors 340          330 Teleoperation Behaviors

| Manipulator Payload Model 340b | Gimbal Payload Model 340a | Gimbal Payload Model 330c | Skid Steer Vehicle Model 330b | Hovering Vehicle Model 330a |
|---|---|---|---|---|

Platform Conversion Function Blocks 350

| Drone Platform Conv 350a | Gimbal Platform Conv 350b | Skid Steer Platform Conv 350c | Manipulator Platform Conv 350d |
|---|---|---|---|

Unmanned Systems 360

| Drone 360a | PZT Camera 360b | Ground Robot 360c |
|---|---|---| a scalable, more connected interoperable approach to control of unmanned systems over existing unmanned systems technology.

20 Claims, 7 Drawing Sheets

(51) Int. Cl.

| | |
|---|---|
| *G05D 1/228* | (2024.01) |
| *G05D 1/229* | (2024.01) |
| *G05D 1/40* | (2024.01) |
| *G06F 8/40* | (2018.01) |
| *G08G 1/00* | (2006.01) |
| *G08G 7/00* | (2006.01) |
| *G08G 9/00* | (2006.01) |

(52) U.S. Cl.
CPC ................. *G05D 1/40* (2024.01); *G06F 8/40* (2013.01); *G08G 1/20* (2013.01); *G08G 7/00* (2013.01); *G08G 9/00* (2013.01); *G05D 1/229* (2024.01)

(58) Field of Classification Search
CPC .......... G05D 1/0094; G06F 8/40; G08G 1/20; G08G 7/00; G08G 9/00
See application file for complete search history.

(56) References Cited

U.S. PATENT DOCUMENTS

| | | | | |
|---|---|---|---|---|
| 9,833,901 | B2 * | 12/2017 | Perrone | ................ G05D 1/0088 |
| 10,054,939 | B1 | 8/2018 | Applewhite | |
| 11,334,069 | B1 | 5/2022 | Buerger et al. | |
| 2009/0216390 | A1 * | 8/2009 | Smith | ..................... H04L 69/08 |
| | | | | 701/2 |
| 2010/0312917 | A1 | 12/2010 | Allport | |
| 2011/0106338 | A1 | 5/2011 | Allis et al. | |
| 2012/0191269 | A1 * | 7/2012 | Chen | .................... G05D 1/0038 |
| | | | | 701/2 |
| 2014/0350723 | A1 * | 11/2014 | Prieto | .................. G05B 19/409 |
| | | | | 700/248 |
| 2015/0142211 | A1 * | 5/2015 | Shehata | .................. H04W 4/42 |
| | | | | 701/2 |
| 2017/0015405 | A1 | 1/2017 | Chau et al. | |
| 2017/0308079 | A1 * | 10/2017 | Bash | .................... G05D 1/0022 |
| 2018/0081354 | A1 * | 3/2018 | Magy | ....................... H04K 3/92 |
| 2019/0339691 | A1 | 11/2019 | Scrapper et al. | |
| 2019/0363821 | A1 * | 11/2019 | Whittaker | ............ G05D 1/0022 |
| 2020/0298818 | A1 * | 9/2020 | Malone | ................. B60W 50/12 |
| 2020/0368913 | A1 * | 11/2020 | Scott | .................. G05B 23/0216 |
| 2020/0410874 | A1 * | 12/2020 | Jensen | ..................... G08G 5/26 |
| 2021/0405661 | A1 | 12/2021 | Liu | |

OTHER PUBLICATIONS

Extended European Search Report issued in corresponding European Application No. 22180834.8 on Nov. 7, 2022 (10 pages).
Extended European Search Report issued in corresponding European Application No. 22180852.0 on Jan. 13, 2023 (5 pages).
Extended European Search Report issued in corresponding European Patent Application No. 23215657.0 on Apr. 18, 2024 (5 pages).
Office Action Non-Final mailed Sep. 12, 2025, in U.S. Appl. No. 18/469,635 (31 pages).

* cited by examiner

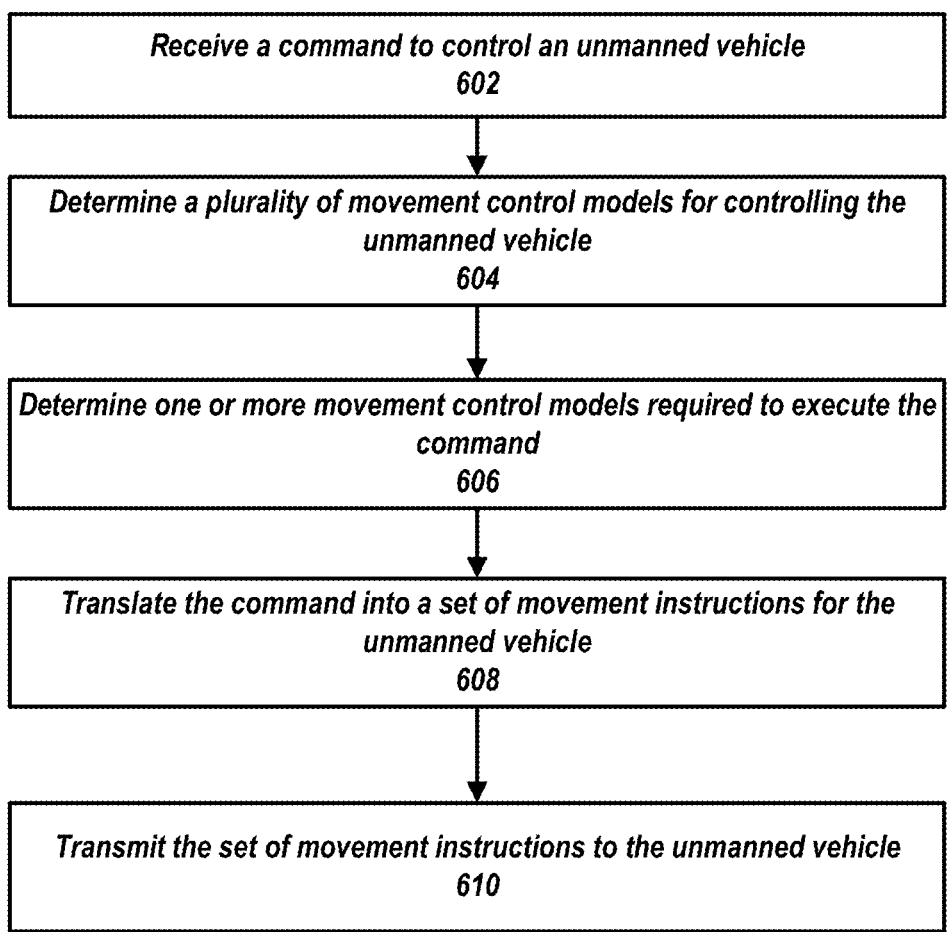

600

Receive a command to control an unmanned vehicle
602

Determine a plurality of movement control models for controlling the unmanned vehicle
604

Determine one or more movement control models required to execute the command
606

Translate the command into a set of movement instructions for the unmanned vehicle
608

Transmit the set of movement instructions to the unmanned vehicle
610

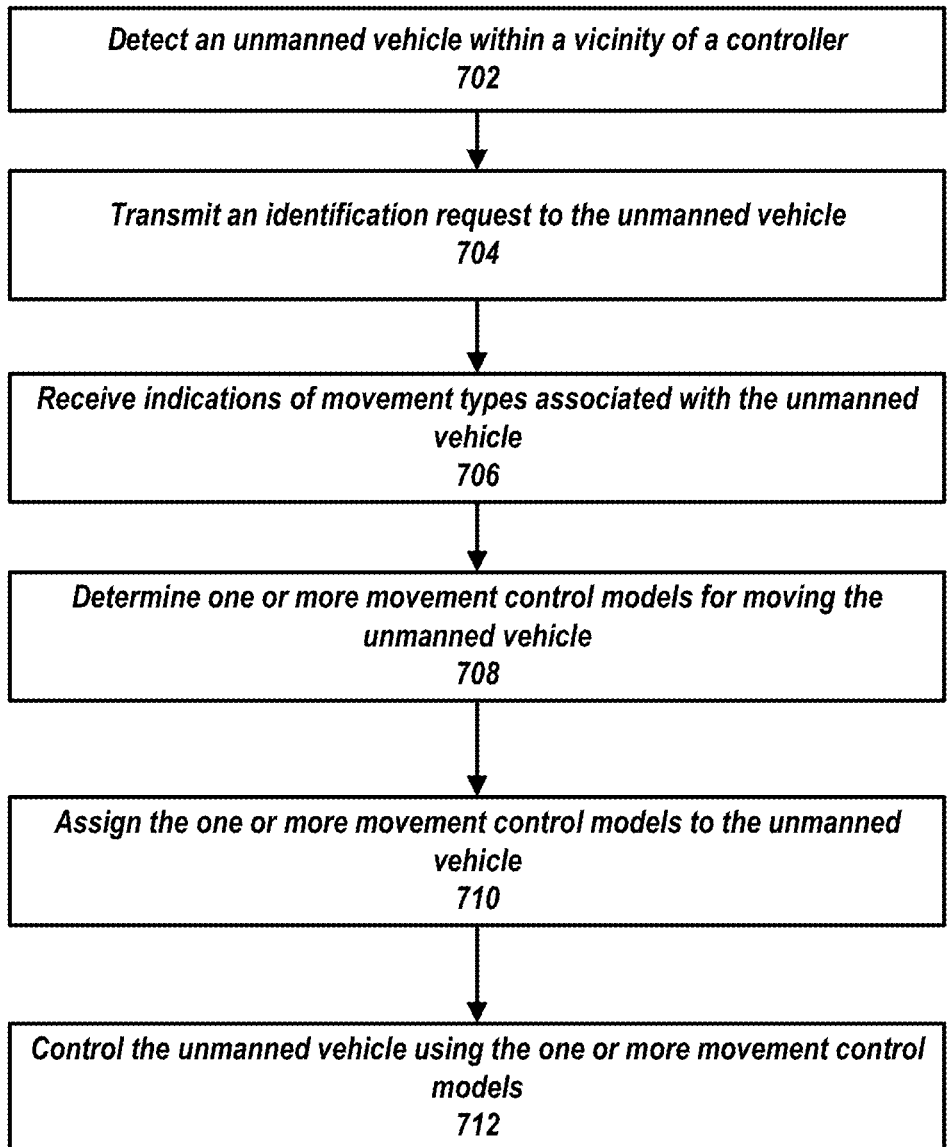

*Detect an unmanned vehicle within a vicinity of a controller*
*702*

*Transmit an identification request to the unmanned vehicle*
*704*

*Receive indications of movement types associated with the unmanned vehicle*
*706*

*Determine one or more movement control models for moving the unmanned vehicle*
*708*

*Assign the one or more movement control models to the unmanned vehicle*
*710*

*Control the unmanned vehicle using the one or more movement control models*
*712*

*FIG. 7*

UNIVERSAL CONTROL ARCHITECTURE FOR CONTROL OF UNMANNED SYSTEMS

CROSS-REFERENCE TO RELATED APPLICATION(S)

This application claims priority to and the benefit of U.S. Provisional Application No. 63/215,043, filed Jun. 25, 2021, titled COMMON CONTROL ARCHITECTURE OF MULTI-DOMAIN UNMANNED SYSTEMS, the disclosure of which is incorporated herein by reference in its entirety.

TECHNICAL FIELD

The present disclosure generally relates to unmanned systems, and more particularly to a universal control architecture configured to control unmanned systems using a common control device.

BACKGROUND

Affordable, stable, and reliable robotic systems are becoming increasingly common, which has contributed to the recent advancement and proliferation of unmanned system technologies, which can be ground-based systems, aerial-based systems, and/or maritime-based systems. Typical unmanned systems involve platform-specific functions in which one user device controls an individual unmanned system. This approach can result in a network having multiple one-to-one subnetworks in which a single user device (e.g., a controller) controls only its respective unmanned system. Such a disjointed, closed subnetwork operation is highly undesirable as there is no situational awareness when controlling each of these unmanned systems. Further, this paradigm requires a controller per connected unmanned system, impeding mobile operations and transport. These problems are compounded considerably as more unmanned systems are added to a network because the number of user devices (and corresponding subnetworks) will also increase. Thus, there is a need for an all-encompassing control architecture which provides high-level situational awareness and control of multiple unmanned systems while using a single (or common) control device.

SUMMARY

In contrast to the fragmented approach used in conventional art, exemplary embodiments of the disclosed common command and control architecture (alternatively termed herein as a "universal control architecture") allows different unmanned systems, including different types of unmanned systems (e.g., air, ground, and/or maritime unmanned systems), to be controlled simultaneously through a common control device (e.g., a controller that can be an input and/or output device). The universal control architecture brings significant efficiency gains in engineering, deployment, training, maintenance, and future upgrades of unmanned systems. In addition, the disclosed common command and control architecture breaks the traditional stovepipe development involving deployment models and thus reducing hardware and software maintenance, creating a streamlined training/proficiency initiative, reducing physical space requirements for transport, and creating a scalable, more connected interoperable approach to control of unmanned systems over existing unmanned systems technology. "Unmanned systems," can include, but are not limited to, unmanned aerial systems, unmanned ground systems, and/or unmanned maritime systems (e.g., surface water systems and/or underwater systems). Each of the unmanned systems can include subsystems such as vehicles and/or payloads. In addition, each of the unmanned systems can be stationary or mobile.

Embodiments disclosed herein are directed at using a scalable, common command and control architecture involving a common user device (e.g., a controller that can be an input and/or output device) to control one or more unmanned vehicles. The controller may receive a command to control an unmanned vehicle. The unmanned vehicle may include a payload device. The payload device may be, for example, a camera that enables the unmanned vehicle to capture images and/or video. The payload device may rotate using a rotation mechanism (e.g., a gimbal). For example, the unmanned vehicle may be an aerial drone carrying a camera that is able to rotate 360 degrees to capture images and/or video footage. In some embodiments, the drone may also have a multi-directional microphone for audio capture.

In some embodiments, the command may be a command to control a plurality of unmanned vehicles. The plurality of unmanned vehicles may include unmanned aerial vehicles, unmanned water vehicles and/or unmanned ground vehicles. For example, the command may instruct the plurality of vehicles to move forward or to follow the controller. In another example, the command may give the plurality of vehicles coordinates to move toward.

The controller may determine a plurality of movement control models for controlling the unmanned vehicle. Each movement control model of the plurality of movement control models may translate commands into movement instructions for the unmanned vehicle or the payload device. For example, an unmanned aerial vehicle may include a camera attached to a gimbal and may be enabled to fly and hover. Thus, this kind of unmanned aerial vehicle may be associated with three movement models. The first movement model may be a movement model that moves the unmanned aerial vehicle. The second model may be a hovering model that enables the unmanned aerial vehicle to hover and a third movement model may be a movement model enabling moving the camera attached to the gimbal. Thus, the controller may identify all the models associated with the unmanned ariel vehicle that may be needed to execute the command on the unmanned aerial vehicle.

In some embodiments, where the command is to be executed on multiple unmanned vehicles, the controller may identify/determine movement control models associated with each of the multiple unmanned vehicles. For example, if one of the vehicles is a ground vehicle that uses skid-steer movement, the controller may identify a movement model associated with skid-steer vehicle movement. In another example, if one of the multiple vehicles is an unmanned water vehicle, the controller may identify a model associated with the movement type of that unmanned water vehicle.

The controller may determine, based on the command, one or more movement control models of the plurality of movement control models required to execute the command. For example, the controller may analyze a command and determine that the command requires that the unmanned vehicle move in a particular direction. Thus, the controller may identify, for the unmanned vehicle, a movement control model that enables movement of the unmanned vehicle. As discussed above, if the unmanned vehicle is an unmanned aerial vehicle and the command requires moving that vehicle in a particular direction, the controller may retrieve the flight movement model associated with that unmanned aerial vehicle. The controller may then input movement data into that movement control model. For example, the movement data may be a direction (e.g., a relative direction or an absolute direction). In some embodiments, where the command is meant for multiple unmanned vehicles, the controller may repeat this process for each unmanned vehicle.

In some embodiments, the controller may determine that the command instructs the unmanned vehicle to track an object located in a particular direction. The controller may then determine, based on the payload device, that the unmanned vehicle includes a tracking payload (e.g., a camera, a radar, or another suitable tracking payload). The controller may then input the second direction into a tracking payload control model. For example, the controller may receive a command to scan for incoming objects (e.g., vehicles or people) from a particular direction. The controller may determine that the unmanned vehicle includes a tracking payload (e.g., a camera). The controller may retrieve a gimbal movement model associated with the camera and input the direction of scanning into the gimbal movement model. In some embodiments, where the command is meant for multiple unmanned vehicles, the controller may identify those vehicles with tracking payloads, and determine/identify movement models that enable the tracking payload device to be moved so that the unmanned vehicle is enabled to scan in the right direction. For example, if a second vehicle is an unmanned ground vehicle with a radar, the controller may identify a movement model associated with a gimbal corresponding to the radar. Thus, the operator of the controller may receive both camera imaging and radar imaging in response to the command.

The controller may then translate, using the one or more movement control models, the command into a set of movement instructions for the unmanned vehicle. For example, if the vehicle is an unmanned aerial vehicle and the command requires the unmanned vehicle to move in a particular direction, the flying control model of that unmanned vehicle may translate the command into particular coordinates and/or direction for moving that unmanned vehicle. If the command is meant for a plurality of unmanned vehicles, the controller may repeat the translation operation for multiple vehicles.

In some cases, the different unmanned vehicles may be communicating using different communication protocols. Thus, the controller may determine, for the unmanned vehicle, a communication protocol for communicating with the unmanned vehicle and format the set of movement instructions according to the communication protocol. The controller may abstract vehicle parameters from this protocol to develop the aforementioned movement models. After the controller has determined the correct type of motion for vehicle type, the controller may then transmit the set of movement instructions to the unmanned vehicle.

As discussed above, the controller may determine that the unmanned vehicle is an unmanned aerial vehicle having a rotating camera. The controller may then retrieve a flying movement control model, a hovering movement control model, gimbal movement control model, and a video control model for the unmanned aerial vehicle. As part of the translation operation, the controller may determine that the command requires the unmanned aerial vehicle to hover at a particular location and input coordinates associated with the particular location into the hovering movement control model. The controller may then receive from the hovering movement control model a set of hovering instructions and transmitting the set of hovering instructions to the unmanned aerial vehicle. In some embodiments, the controller may identify the communication protocol associated with the unmanned vehicle and format the instructions according to the communication protocol.

In some embodiments, the controller may determine that the command requires the unmanned aerial vehicle to record a video stream of a particular location and may input coordinates associated with the particular location into the gimbal movement control model. The controller may receive from the gimbal movement control model a set of instructions for moving a camera into position; and transmit, to the unmanned aerial vehicle, the set of instructions for moving the camera into the position. In some embodiments, the controller may identify the communication protocol associated with the unmanned vehicle and format the instructions according to the communication protocol. In some embodiments, where the command is meant for multiple unmanned vehicles, the controller may repeat this process for each unmanned vehicle.

In some embodiments, the controller may determine that the command requires an autonomous mode of operation for the unmanned vehicle, and may periodically, generate and transmit subsequent sets of movement instructions to the unmanned vehicle. For example, an autonomous operation mode may be an operator inputting a command into the controller for an unmanned aerial vehicle to hover above specific coordinates, while manual mode of operation may require that the operator actually control the unmanned aerial vehicle (e.g., via a joystick or another suitable controlling device) directly.

Embodiments disclosed herein are directed at using a scalable, common command and control architecture involving a common user device (e.g., a controller that can be an input and/or output device) to add unmanned vehicles to the common command and control architecture. The controller may detect an unmanned vehicle within a vicinity. For example, the unmanned vehicle may include a wireless transceiver that may broadcast a signal (e.g., including an identifier associated with the unmanned vehicle). The unmanned vehicle may include a payload device (e.g., a camera or another device attached to a gimbal).

The controller may transmit an identification request to the unmanned vehicle. For example, the controller may broadcast a wireless signal asking for identification information. The signal may be received by the transceiver on the unmanned ground vehicle. In some embodiments, the detection and identification request may be performed using a wired connection. For example, the controller may be connected to the unmanned vehicle using a wire and the signals may be transmitted back and forth over that wire.

The controller may receive, in response to the identification request, indications of movement types associated with the unmanned vehicle and other vehicle information. Each movement type may be associated with one or more movement commands supported by the unmanned vehicle. For example, if the unmanned vehicle is an unmanned aerial vehicle, the unmanned vehicle may support hovering commands, flying commands, etc. If the unmanned vehicle is an unmanned water vehicle, movement commands may include underwater operating commands, above-water operating commands, etc.

In some embodiments, vehicle information may include payload types associated with the unmanned vehicle and/or communication protocol associated with the unmanned vehicle. For example, the payload types may include a gimbal (e.g., for rotating an attached device). Another payload type may be a camera attached to the gimbal (e.g., the camera may have its own payload movement control model for zooming, etc.). The communication protocol may be any protocol supported by the unmanned vehicle (e.g., MAV-Link, JAUS, ROS, etc.)

The controller may determine, based on the indications of movement types associated with the unmanned vehicle, one or more movement control models for moving the unmanned vehicle. Each movement control model translates operator commands or automation inputs into movement instructions for the unmanned vehicle. For example, if the unmanned vehicle supports hovering as a movement type, the controller may assign a hovering movement control model to the unmanned vehicle object corresponding to the unmanned vehicle. In another example, if the unmanned vehicle supports fixed-wing flight as a movement type, the controller may assign a fixed-wing flight movement control model to the object. In some embodiments, if the unmanned vehicle is a skid-steer vehicle, the controller may assign a skid-steer control model to the unmanned vehicle.

In some embodiments, the controller may perform the following operations when determining one or more movement control models. The controller may receive, from the unmanned vehicle, a plurality of supported movement commands and match the plurality of supported movement commands with one or more movement control models. For example, the controller may store a listing of movement commands and corresponding control model(s) that support those commands. The controller may then assign, to an unmanned vehicle object, one or more movement control models that match the plurality of supported movement commands. For example, the controller may try to identify the least number of movement control models that may cover all the movement commands supported by the unmanned vehicle.

In some embodiments, the controller may generate a new movement control model based on the commands supported by the unmanned vehicle. The controller may determine that a first movement control model matches a first portion of the plurality of supported movement commands and a second movement control model matches a second portion of the plurality of supported movement commands. For example, a particular movement control model may match some commands while another movement control model may match other commands. Thus, the controller may generate a new movement control model that includes a first application programming interface for the first portion of the plurality of supported movement commands and a second application programming interface for the second portion of the plurality of supported movement commands.

In some embodiments, the controller may determine a payload movement control model for moving or controlling state of the payload device associated with the unmanned vehicle. For example, if the unmanned vehicle includes a gimbal and a mounted camera, the controller may assign a gimbal movement control model and a camera control model to the unmanned vehicle. The gimbal movement control model may translate instructions from the user (e.g., rotate up, rotate down, rotate left, etc.) into instructions for the gimbal. Thus, the controller may assign the one or more movement control models to the unmanned vehicle. The control may also assign the payload movement control model(s) and the communication protocol to the unmanned vehicle. The controller may then control the unmanned vehicle using the one or more movement control models and may control the payload(s) using payload movement control model(s). In some embodiments, the payload movement control model may control the state of the payload device (e.g., power on/off, record a data sample (photo video, radio etc.)).

In some embodiments, the controller may receive, from the unmanned vehicle, a plurality of supported payload commands and match the plurality of supported payload commands with one or more payload movement control models. For example, the controller may store a listing of payload movement commands and corresponding payload movement control model(s) that support those commands. The controller may then assign to an unmanned vehicle object, the one or more payload movement control models that match the plurality of supported payload commands.

The controller may test the assigned movement control models. In particular, the controller may generate a plurality of test commands for the unmanned vehicle. Each test command of the plurality of test commands may test a particular movement control model or a payload movement control model. For example, the controller may generate a command the instructs the unmanned aerial vehicle to hover at particular coordinates. In another example, the controller may instruct an unmanned ground vehicle to drive to particular coordinates. The test may also include testing the payload device. Thus, a test command may instruct a gimbal to rotate a certain number of degrees.

The controller may translate, using the one or more movement control models, the plurality of test commands into a plurality of sets of movement instructions for the unmanned vehicle. For example, the controller may input the command into an appropriate movement control model and receive a corresponding set of movement instructions. The controller may then format the plurality of sets of movement instructions according to a communication protocol associated with the unmanned vehicle. For example, if the protocol supported by the unmanned vehicle is MAV-Link, the controller may format the set of instructions according to the MAVLink protocol. The controller may then transmit the plurality of sets of movement instructions formatted according to the communication protocol to the unmanned vehicle.

In some embodiments, the controller may receive, from the unmanned vehicle, position information resulting from the execution of the plurality of sets of movement instructions. For example, the position information may be geographic coordinates of a hovering unmanned aerial vehicle. In another example, the position information may be geographic coordinates of an unmanned ground vehicle.

The controller may then determine, based on the one or more movement control models, expected position information associated with the unmanned vehicle. For example, the controller may determine, based on output from the movement control model, that after executing the test command, the unmanned vehicle should be located at a particular set of coordinates. Thus, the controller may determine, based on the expected position information and the position information from the unmanned vehicle, whether the plurality of sets of instructions moved the unmanned vehicle into an expected position. For example, if the geographic coordinates of the unmanned vehicle match the expected coordinates of the unmanned vehicle, the controller may determine that the test command(s) were successful. If there is no match, the controller may notify the operator that there has been an error with the unmanned vehicle on-boarding process.

The controller may also test the assigned payload movement control model(s). For example, the controller may test the gimbal device attached to the unmanned vehicle. The controller may receive, from the unmanned vehicle, payload orientation information resulting from execution of a set of instructions for moving a payload device. In some embodiments, the payload orientation information may be determined based on geographic location of the unmanned vehicle and instrument readings (e.g., heading, orientation, etc. using, for example, a gyroscope, magnetometer, etc.).

The controller may determine, based on a payload movement control model, expected orientation information associated with the payload device. For example, the controller may input the test command into the appropriate model and receive back an expected orientation of the payload device. The controller may then determine, based on the expected orientation information and the payload orientation information from the unmanned vehicle, whether the set of instructions moved the payload device into an expected orientation.

BRIEF DESCRIPTION OF THE DRAWINGS

FIG. 6 is a flowchart of operations for using the universal control architecture to control one or more unmanned vehicles in accordance with an embodiment of the present disclosure.

FIG. 7 is a flowchart of operations for using the universal control architecture to add unmanned vehicles to be controlled in accordance with an embodiment of the present disclosure.

DETAILED DESCRIPTION

Figure 1:
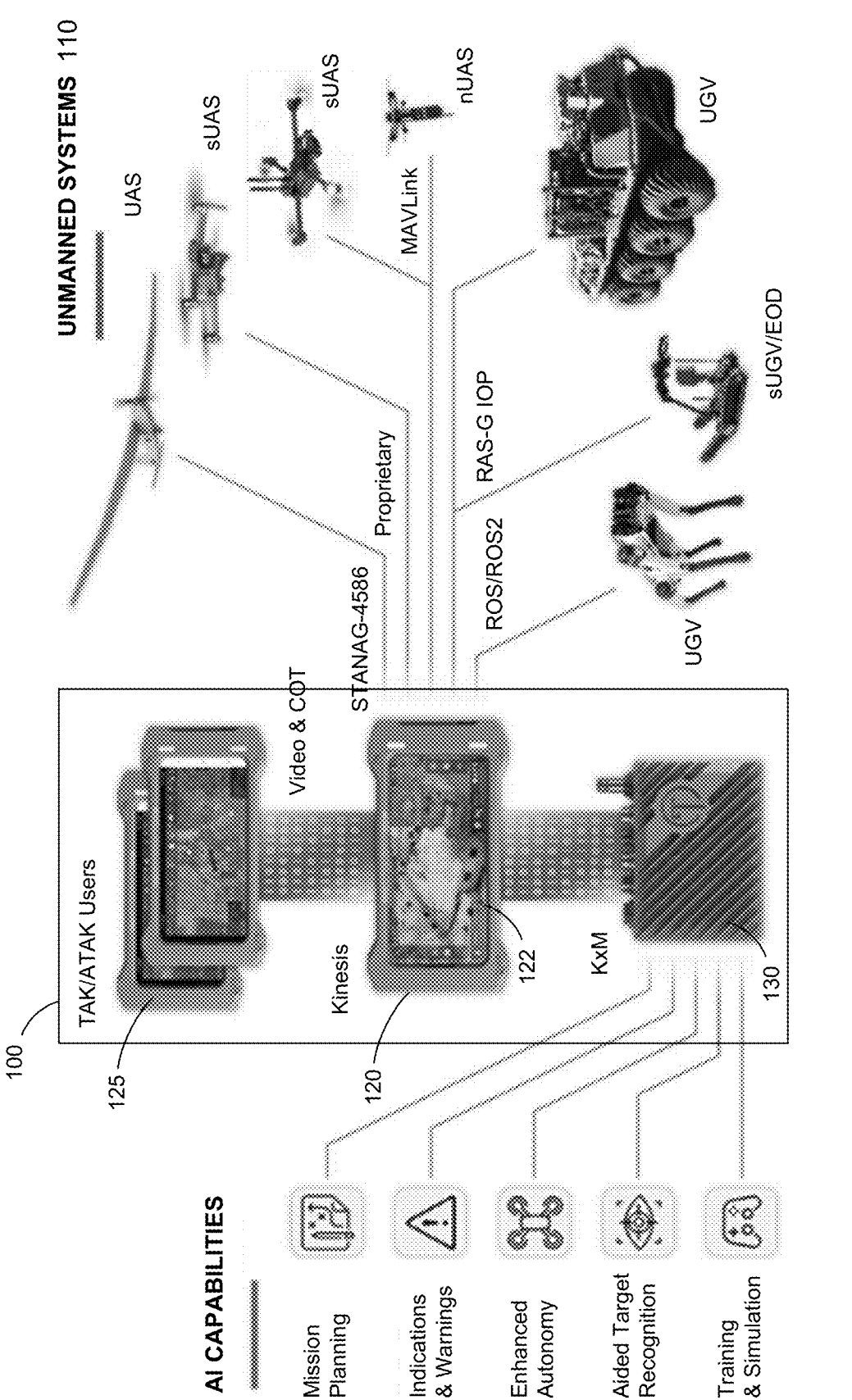
FIG. 1 shows a universal control architecture controlling multiple unmanned systems using a common control device in accordance with an embodiment of the present disclosure.

Embodiments of the present disclosure are directed at a universal control architecture for controlling one or more unmanned systems using a common control device (e.g., a controller that can receive user inputs and/or provides audio/visual outputs to the user). The type of common control device is not limiting so long as the common control device can be connected to a network (e.g., wired and/or wireless). Non-limiting examples of the common control device can be a gamepad-type input device (with or without a display and/or audio), a joystick(s) input device (with or without a display and/or audio), and/or a spatial input device such as a mobile phone, a tablet computer or any other input device that utilizes inertial measurements for unmanned systems input commands. In one embodiment, the common control device can include, for example(s), a Samsung S20 mobile device Bluetooth paired with a Microsoft Xbox 360 controller, or a Tomahawk Robotics Grip controller, or a Tomahawk Robotics Mimic, that an operator can use to control any unmanned system. Non-limiting examples of the network can include packet-based networks such as, for example, local Internet Protocol (IP) networks, global IP networks such as the world wide web, isolated ad-hoc mobile networks, Internet of Things (IoT) networks such as Zigbee/ZWave and cellular networks such as Verizon, AT&T, and T-Mobile. The disclosed universal control architecture can be configured to provide common control of more than one unmanned system and/or more than one subsystem within an unmanned system. The unmanned systems and/or subsystems can be configured to operate in applications that include air-based application, ground-based applications, and/or maritime-based (sea-based) applications using a common control device. The disclosed universal control architecture can be configured to provide a single, uniform control scheme to different types of control modalities or functions that can be performed by the unmanned systems, such as, for example, driving, hovering, gliding, manipulating, orienting, pointing, tracking, etc. By using a single, uniform control scheme, an operator can control many unmanned systems, including different types of unmanned system vehicle/payload platforms (e.g., unmanned ground vehicles (UGVs), unmanned air vehicles (UAVs), gimbals, manipulators, etc.) and/or vehicle/payload platforms from different manufactures, based on a common control experience, which reduces or eliminates training time and cost.

In exemplary embodiments, the disclosed universal control architecture can operate over any type of packet-based network (e.g., IP networks, etc.), whether wired and/or wireless. Although not limited to an IP network, exemplary embodiments of the present disclosure can operate in an IP network environment. The disclosed universal control architecture can use the network to share data (e.g., control data and/or telemetry data) between one or more devices (e.g., controllers, artificial intelligence (AI) modules, monitors, etc.) and/or unmanned systems on the network. In some embodiments, the universal control architecture can be configured to allow any operator on the network to take control of any unmanned system on the network. Any operators on the network can either request access from other operators or be granted automatic access based on role-based priority tier. As an example, operator 1 is operating unmanned system 1 and during active operation of unmanned system 1, operator 2 requests the operation of unmanned system 1, and operator 1 grants the access. In another example, operator 1 is operating unmanned system 1, and operator 2 (operator 1's supervisor) comes on the network and can immediate take control of unmanned system 1. The exemplary embodiments of the present disclosure allow for controlling any of the control models independently and simultaneously by any operator in the network. As an example, operator 1 can control the flight control model while operator 2 controls the gimbal payload via the gimbal control model simultaneously, creating an ability to team/coordinate actions with a target unmanned system platform. Accordingly, exemplary embodiments of the present disclosure allow deployment on existing tactical or commercial networks without having to deploy new infrastructure, which provides a cost savings. Furthermore, in contrast to the "closed ecosystem" design of today's unmanned systems that limits sharing of data, the disclosed universal control architecture allows secure sharing of data, including mission-critical data, and other information between devices and/or unmanned systems on the network. Through synthesis of the common networked situational awareness data (position, altitude, vehicle orientation, gimbal orientation, full motion video, other payload status, etc.) and unmanned system capability data (aerial hovering vehicle, aerial fixed wing vehicle with gimbal and camera, aerial hybrid with gimbal and camera, skid-steer ground vehicle with forward view camera and robotic manipulator, etc.), the universal control architecture can facilitate enhanced capabilities such as multi-robot cooperation, division of work amongst robots and operators, or swarming not possible by closed-network approaches.

A conventional unmanned system application can include a defense-related scenario in which squads of soldiers are deployed in an urban area where ground vehicles and aerial vehicles provide reconnaissance data to one or more of the squads of soldiers. In the conventional system, each ground vehicle is typically controlled by a dedicated operator control station that is typically a large Windows PC-based station, and each unmanned aerial vehicle is typically controlled by a dedicated handheld controller with a built-in screen. Thus, in conventional systems, a soldier may be forced to carry multiple heavy dedicated controller hardware through difficult terrain and/or in adverse weather conditions, sacrificing size and weight that could be traded for more important equipment.

In addition to dedicated controllers, each deployed soldier in a conventional system can carry an end user device (e.g., a handheld communication device such as an Android phone, other mobile device, or other type of communication device, etc.) mounted to his/her chest for situational awareness. However, such situational awareness can be limited to the closed network of the controller/unmanned system. That is, each unmanned air and ground vehicle can only be operated by the soldier(s) who has(have) the controller for its respective unmanned vehicle. Thus, the control system associated with an unmanned system only has a situational awareness of its unmanned system, including the operator (e.g., soldier) controlling the unmanned system, which means that the control system does not have any situational awareness of the rest of the operator's team or other unmanned systems. For example, video, sensor data, and location information gathered by an unmanned ground vehicle cannot be shared or disseminated to the rest of the squad(s) (e.g., support solder(s) with end user devices, a squad operating other unmanned systems such as unmanned aerial system, etc.) without a separate third-party solution or a voice callout via radio. Such closed network systems are highly undesirable. In addition to the above drawbacks, in conventional systems, each soldier operating an unmanned system undergoes prior training in that specific type of unmanned system. Thus, operation of other types of unmanned systems will require additional and/or different type of specific training for those unmanned systems.

In exemplary embodiments of the present disclosure the universal control architecture disclosed herein facilitates automatically sharing metadata, video, and/or other information from the unmanned system with other devices on the network. For example, an unmanned system's location, energy levels, motion capture video, sensor pointing information, and/or other data generated by an unmanned system can be used to create a "data stream" that can be shared with other devices and/or other unmanned systems. Furthermore, by facilitating control using a common control device that can operate multiple types of unmanned systems, the disclosed universal common control architecture allows the operator to do away with heavy dedicated controller hardware of conventional unmanned system networks. The "data stream" created for each control model type is passed over a packet-based network, such as an IP network, to other operators on the network so that their controller, using the common control architecture, can disseminate the data and allow the operator to view or control, as described previously, any available unmanned systems on the network.

FIG. 1 shows an exemplary embodiment of a universal control architecture 100 used in controlling one or more unmanned systems 110. The unmanned systems 110 can be controlled by a common control device 120. For example, common control device 120, which can be, for example, a single handheld controller, can have a video display 122 (and/or audio output, not shown, in the form of speakers, output jacks, wireless connections, etc.). The common control device 120 can be configured to control one or more unmanned systems 110, including one or more ground-based unmanned systems (e.g., UGVs, small unmanned ground vehicles (sUGVs), sUGVs with explosive ordinance disposal [EOD] capabilities, etc.), one or more aerial-based unmanned systems (e.g., UAS, small UAS, nano UAS, etc.), and/or one or more maritime-based unmanned systems (not shown). Although the common control device 120 is shown controlling seven unmanned systems in FIG. 1, embodiments of the present disclosure can control less than seven or more than seven unmanned systems. That is, there is no restriction on the number of unmanned systems or the types of unmanned systems (e.g., ground-based, aerial-based, or maritime-based) that can be associated with the universal control architecture disclosed herein. In addition, exemplary embodiments of the disclosed universal control architecture can be agnostic to the communication protocol (e.g., ROS, MAVLink, JAUS, a proprietary communication protocol, etc.) used by and/or configured to run on an unmanned system.

In some embodiments, the common control device 120 can be game-type controller, a mobile phone, a tablet computer, another type of handheld device, or another type of portable communication device that can comprise one or more application programs and/or plugins configured to run an ecosystem (e.g., a network of actors, services, capabilities, information flows, and supporting architecture corresponding to unmanned system operations). For example, as seen in FIG. 1, the common user device 120 can be a handheld communication device running Kinesis™ software from Tomahawk Robotics to provide a secure common control system for multiple unmanned systems. Further, in some embodiments, the common control device 120 can be connected to an extension module 130 (e.g., a Kinesis Expansion Module (KxM) module from Tomahawk Robotics). The extension module 130 can also run application programs and/or plugins and can be regarded as an extension of the ecosystem controlled by the common control device 120.

The extension module 130 can be configured to receive, distribute, and process large amounts of data. This data can be received or distributed via local digital connections (USB) to hosted peripherals or logically over a larger IP network using connected communications equipment (cellular radios, closed network radio, internet connection, etc.). In some embodiments, the extension module 130 allows for edge processing, which helps with data privacy and security, reduce system costs by not having a centralized server (e.g., a cloud server), and/or reduce latency and/or bandwidth issues by having the data processed (e.g., enhanced filtering, object detection, change detection, etc.) and controlled (e.g., further compressed, for example digital video, for larger network distribution, down-sampled, transcoded for efficient network traversal, etc.) at the deployment site. In some embodiments, the extension module 130 can be configured to facilitate one or more AI capabilities (e.g., mission planning capability, capability to provide indications and warnings, enhanced autonomy capability, aided target detection capability, training and simulation capability, and/or other AI capabilities). Thus, by providing the AI capabilities to the extension module 130, the situational awareness in the unmanned system can be enhanced depending on the deployment scenario.

In exemplary embodiments, the universal control architecture can include other devices that can provide situational awareness to persons (e.g., soldiers) and/or equipment on the network. For example, as indicated above, a user in the system can carry (e.g., mounted to his/her chest) an end user device (e.g., a handheld communication device such as an Android phone, other mobile device, or other type of communication device, etc.) for situational awareness. In exemplary embodiments, the end user device 125 can include an application and/or plug-in that provides situational awareness to the user and/or to other persons/equipment on the network. For example, the end user device 125 can include a Team Awareness Kit (TAK) application, which can be implemented on an Android device (ATAK), to communicate with the common user device 120, the extension module 130, another end user device 125, and/or one or more unmanned systems 110 to provide situational awareness to one or more user on the network. Thus, unlike conventional systems in which situational awareness is limited to the closed network between a controller and the single unmanned system that it controls, the situational awareness in exemplary embodiment of the present disclosure is expanded to include more than one unmanned system and/or more than one controller.

Figure 2:
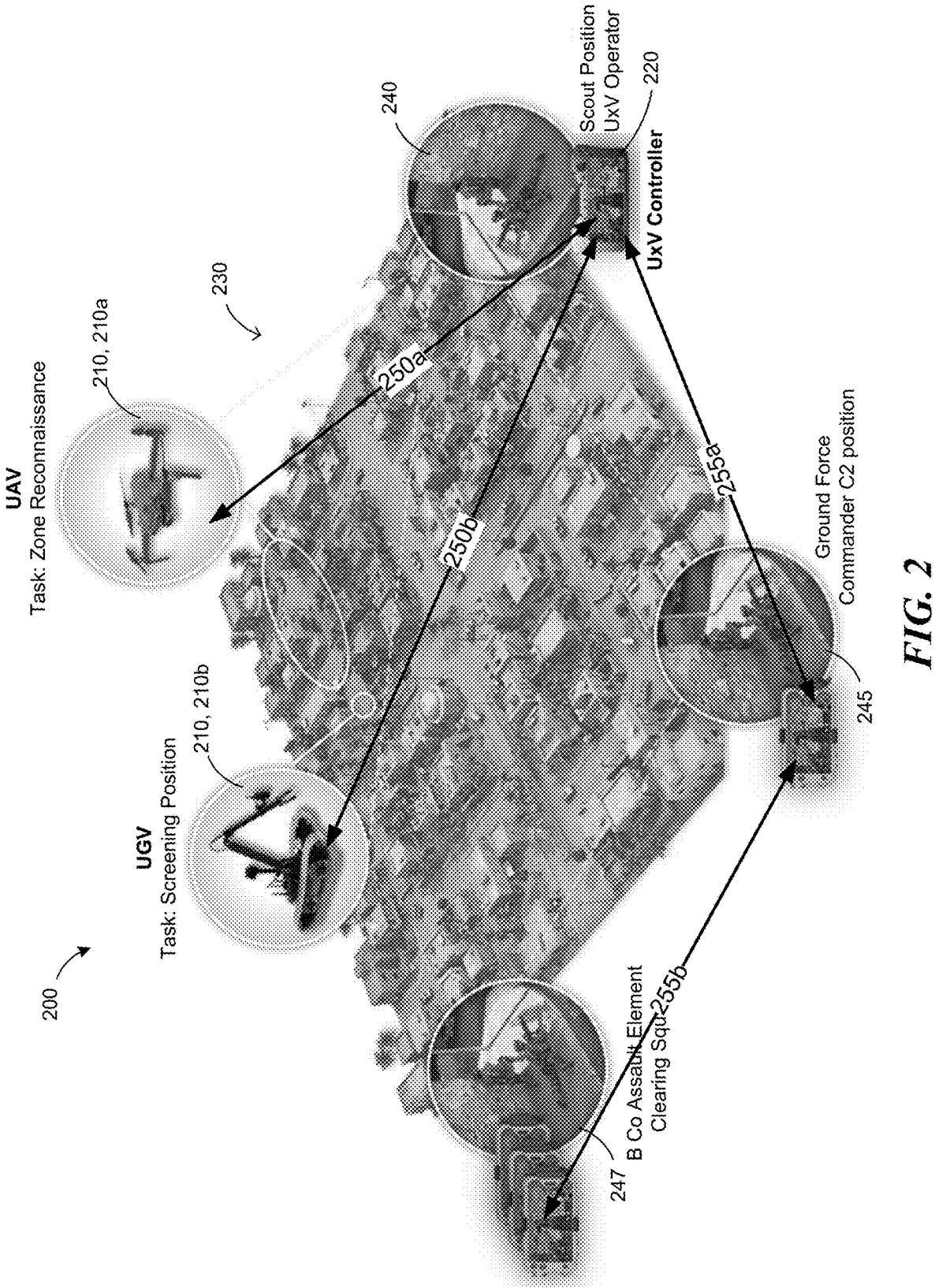
FIG. 2 shows a defense-related case example for a universal control architecture in accordance with an embodiment of the present disclosure.

Exemplary embodiments of the universal command architecture 100 can be used on a variety of scenarios ranging from leisure applications, commercial applications, industrial applications, search and rescue applications, military applications, etc. For example, FIG. 2 shows an exemplary defense-related scenario 200 which uses an exemplary embodiment of the universal command architecture. In the scenario 200, squads of soldiers located in one or more locations in urban area 230 have deployed multiple unmanned systems 210. The unmanned systems 210 can be battery-operated as is the case in scenario 200, but in other scenarios, the unmanned systems can be powered by other sources (e.g., solar, gasoline-based, natural gas, etc.). In the exemplary scenario 200, the unmanned systems 210 can be deployed for the purposes of detecting and removing improvised explosive devices (IEDs) in an urban area 230. For example, in the scenario 200, unmanned aerial vehicle (UAV) 210a and/or unmanned ground vehicle (UGV) 210b can be controlled using a common control device 220, which can be similar to the common control device 120 discussed above. Embodiments of the present disclosure are not limited to controlling two unmanned systems, however. In other scenarios, more than two or less than two unmanned systems can be deployed, and the unmanned systems can be any combination of different types or same types of unmanned systems. The common user device 220 can include applications and/or plugins that allow the operator to control more than one unmanned system (e.g., either the same and/or different types of unmanned systems) using the same common control device 220. In some embodiments, the common control device 220 can be, for example, a UxV controller (or another type of controller) running, for example, Kinesis™ software. The applications and/or plugins in common control device 220 can convert the user inputs received by the common control device 220 to generic commands that can be applied to different unmanned systems having similar functions, including different types of unmanned systems. Thus, a single soldier in squad 240 can operate the common control device 220 to control both UAV 210a and UGV

210b. In some embodiments, the common user device 220 can be connected to one or more end user devices 255, which can be similar to end user device 125. The end user device(s) 255 can use any combination of wired and wireless networks to connect to common control device 220. The end user device(s) 255 can be used by other soldiers within squad 240 and/or other squads 245,247 to potentially facilitate other functions for scenario 200. For example, squad 245 can correspond to the ground force command position that coordinates all the operations in scenario 200, and squad 247 can correspond to an assault element and clearing squad that engages the enemy and/or clears improvised explosive devices (IEDs) that have been located by UAV 210a and UGV 210b. The common control device 220 can control the unmanned systems 210a, 210b using respective control protocols 250a and 250b. In addition, the common control device 220 can communicate with one or more end user devices 255 in squads 245, and/or 247 using control protocols 255a and/or 255b. In some embodiments, an end user device 255 can relay information to one or more other end user devices 255 rather than communicate directly with the common control device 220. For example, in scenario 200, end user device 255 for squad 247 communicates with common control device 220 via the end user device 255 for squad 245, but, in other scenarios, the end user device 255 for squad 247 can communicate directly with common control device 220.

From the above discussions, those skilled in the art can appreciate that the disclosed universal control architecture can comprise of a set of hardware and/or software components to control/monitor one or more unmanned systems using a common control device. In some embodiments, the software components can be distributed across physically separate hardware devices, which can include the common control device, the extended module, the end user device, the unmanned systems, and/or other hardware devices. That is, in some embodiments, individual software components can reside on one or more physically separate hardware devices. In some embodiments, the set of hardware and software components can be reachable on a common network. The network can be ad-hoc, for example, without the need for a central server. When distributed over various hardware devices on the network, exemplary embodiments of the universal control architecture can be functionally operative even if some of its components are unavailable or unreliable. The network, which can be commonly accessible by the hardware devices, can comprise one or more transport layers and physical layers which allows for low-latency connectivity of different types of robotic systems and/or sensors (e.g., body cams, wearable devices, unattended sensors, etc.). Furthermore, the embodiments disclosed herein are agnostic in that the different types of robotic systems and/or sensors do not necessarily need to communicate using the same communication protocol.

In accordance with disclosed embodiments, control information is abstracted and generalized into common control data streams to allow independent control of each vehicular platform subsystem and/or payload platform subsystem regardless of the application type (aerial-based, ground-based, maritime-based, etc.). The control information (e.g., control inputs) can be received manually using either a common user device 220 and/or generated automatically via a generalized software control function running on a device (e.g., common user device 220, or some other device). By abstracting and generalizing the control information, control schemes and autonomy algorithms based on the common control data stream can be applied to a broad range of specific unmanned systems (e.g., broad range of vehicle platforms and/or payload platforms) with minimal or no additional engineering or mental effort. As a result, training efforts are significantly reduced. As the disclosed universal control architecture can operate a wide variety of unmanned systems through the common control interface and control abstraction methods, the user's operational experience for each vehicle platform and/or payload platform is identical, allowing for expedient learning experience. Operational effectiveness and proficiency are also increased due the common experience.

Figure 3:
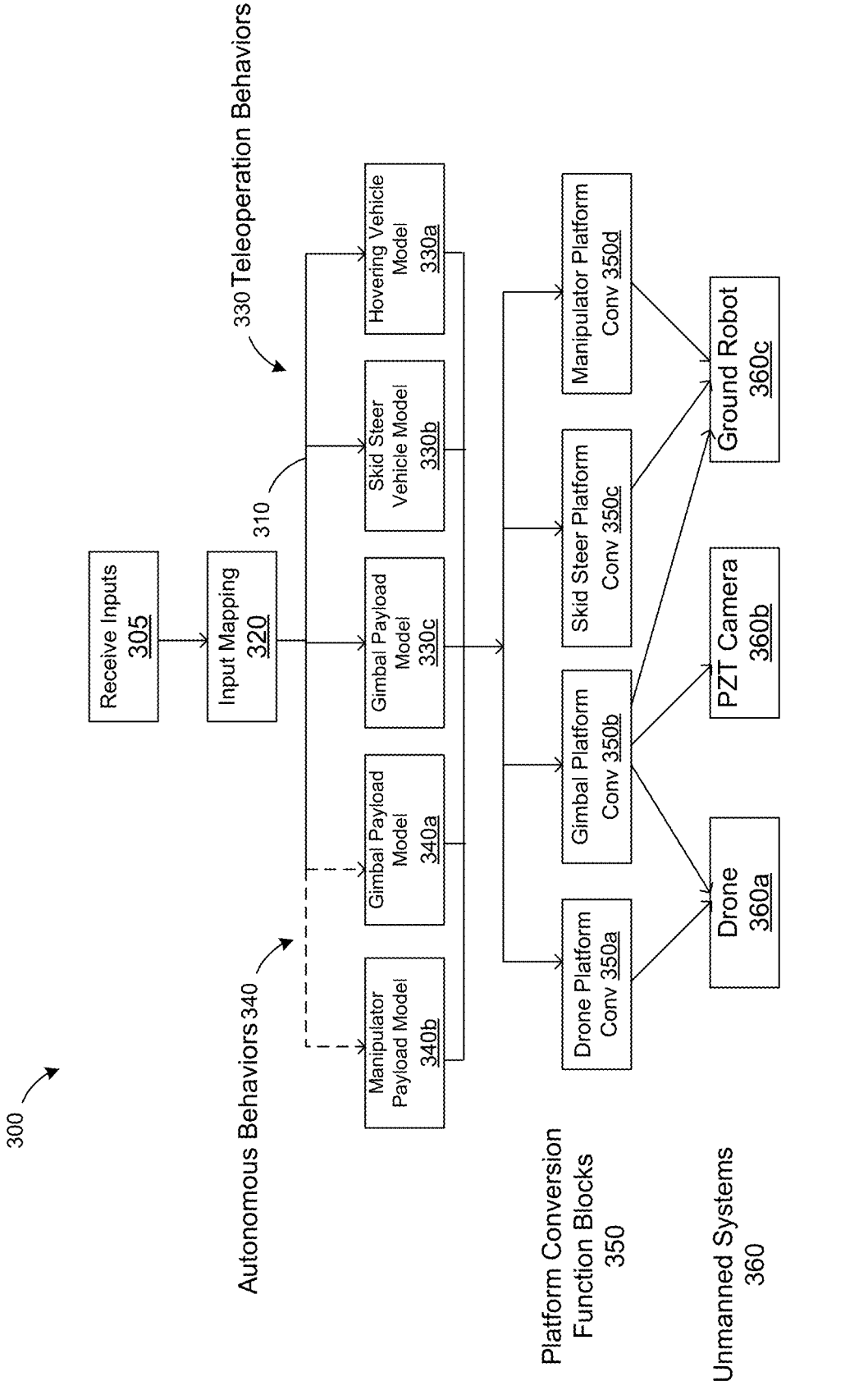
FIG. 3 shows a simplified function block diagram showing the control flow in a universal control architecture in accordance with an embodiment of the present disclosure.

FIG. 3 illustrates a simplified function block diagram of an exemplary embodiment of a universal control architecture that shows the control data flow between a common control device to one or more device-specific heterogeneous unmanned systems via one or more function blocks representing intermediary abstractions and/or decompositions (e.g., non-device specific function blocks). That is, in some embodiments, common control of multiple unmanned systems (including unmanned systems of different application platforms) can be based on decomposing and/or abstracting certain portions of the control data (and/or the status data) so as to be device independent with respect to the unmanned systems and/or the common control device. For example, functional subsystems that are common to more than one unmanned system can be abstracted into generic models to facilitate common control of the unmanned systems. A functional subsystem can be regarded as independent-controllable portion of an unmanned system such as, for example, the vehicle portion and/or the payload portion. In exemplary embodiments, the universal command device abstracts the function subsystems into generic vehicle models or behaviors corresponding to the motion of the unmanned vehicle, generic payload models or behaviors corresponding to the motions of a payload on the unmanned vehicle, and/or generic audio/visual (A/V) format models or behaviors corresponding to information from sensors on the unmanned vehicle and/or payload portions. Examples of a functional subsystem can include a "hovering vehicle" portion (including associated control and/or status information) of respective drones, a "skid-steer vehicle" portion (including associated control and/or status information) of certain ground robots, a "gimbal payload" portion for angular positioning (including control and/or status information), an "n-DOF manipulator payload" portion (e.g., 6-DOF, etc.) for robotic arms comprising, for example, serial revolute joints, etc. Functional subsystems can also include A/V format models for sensors located on the vehicle portion and/or payload portion of certain unmanned systems. Some unmanned systems can include one or more of each type of model (e.g., vehicle models, payload models, and/or A/V format models). For some unmanned systems one or more of each type of model may not be needed. For example, a simple drone with a fixed camera may only need a vehicle model and an A/V format model, a fixedly mounted PTZ (pan-tilt-zoom) camera may only need a camera model, gimbal model and an A/V format model, and a fixedly mounted fixed camera may only need an A/V format model. An unmanned system may include one or more functional subsystems that can be generalized/abstracted into a generic model that is applicable to other unmanned systems.

Turning to FIG. 3, the function block diagram 300 illustrates the control data flow for controlling one or more unmanned systems based on inputs from a common control device by using generic functional subsystem models associated with the unmanned systems. In the exemplary function block diagram 300, the unmanned systems being controlled include a drone 360a, a wall-mounted PTZ camera 360b, and a ground robot 360c. However, in other embodiments, a common control device can additionally or alternately operate any number and combinations of aerial-based, ground-based, and/or maritime-based unmanned systems. The drone 360a can include a hover vehicle subsystem and a gimbal payload subsystem, the wall-mounted PZT camera 360b can include a gimbal payload subsystem, and the ground robot 360c can include a skid steer vehicle subsystem, a gimbal payload subsystem and a manipulator payload subsystem. In exemplary embodiments of the present disclosure, each of unmanned subsystems can be controlled by a common control device.

In receive function block 305, the universal control architecture can receive manual inputs to control one or more selected unmanned systems via, for example, a common control device (and/or another device). The received control inputs can be, for example, device specific information (e.g., information specific to the hardware and/or software used in the device) corresponding to the common control device (and/or another device). Alternatively, or in additional to manual inputs, the received control inputs can be generated by device and/or software functions (e.g., functions used in autonomous operations). The received control input data can be sent to the input mapping function block 320, which interprets the received control inputs with respect to the type of motion being controlled and whether the control is manual and/or autonomous.

As discussed further below, the input mapping function block 320 then creates instances of manual and/or autonomous input functions (not shown in FIG. 3) for each motion in an unmanned system that is being controlled (e.g., one or more payload subsystem motions and/or one or more vehicle subsystem motions). An unmanned system can be controlled based on manual teleoperation, based on autonomous operation, or based on a combination of manual teleoperation and autonomous operation. In some embodiments, the input mapping function block 320 can interpret the control inputs from receive function block 305 and map the interpreted control inputs into an appropriate one or more teleoperation behaviors (corresponding to manual operation) and/or an appropriate one or more autonomous behaviors (corresponding to automated operation) in order to conserve the operator's intent, reducing cognitive burden, while controlling an unmanned system. For example, interpretation between input mapping block 320 and attached vehicle and payload models (e.g., 340b, 340a, 330c, 330b, 330a) is one where the operator wants to operate a camera gimbal payload attached to a hovering vehicle as if it was capable of a continuous pan (movement along the horizontal axis of the camera when looking at the horizon) behavior which some expensive, highly capable aerial vehicles include and which behavior the operator is accustomed to having at their disposal. Lighter weight, lower cost hovering vehicles typically only have a pitch controllable axis as part of the camera gimbal payload and therefore not capable of continuous panning the camera feed without excitation of the host vehicle. In this example, interpretations within the universal control architecture are then used to couple motion between the hovering vehicle and gimbal simultaneously (whether stationary hovering or in motion) to achieve the desired behavior the operator expected, seamlessly and without cognition by the operator, thus achieving a common behavior regardless of gimbal degrees of freedom. Another example is when for instance, the operator is manually teleoperating a hovering vehicle system through an attached gimbal payload that can both pan and pitch (able to move in both the horizontal and vertical axis of the camera system). When the camera is pointing forward, and the horizontal axis of the camera gimbal and hovering vehicles are aligned, operation through the camera feed is very intuitive because a forward command moves the camera and vehicle along the traditional transversal control axis for going forward. However, when those axes become misaligned, say with the camera turned 90 degrees from the centerline of the unmanned system (off to one side of the unmanned system), an operator using a classical control mapping can become disoriented when controlling the combined system (camera and vehicle) as what was once a pure translation of the vehicle forward, now causes the video feed to move side-to-side (strafing) in the operators view on the controller as the vehicle moves along the original transversal (forward as the vehicle was designed) axis. The mapping function of the universal control architecture can recognize the position of the camera payload (off to the side) with respect to the principal transversal control axis and re-map the control to the vehicle to allow the vehicle to always flight straight from the perspective of the camera and not the along the original transversal axis aligned with the vehicle. The end result from this mapping function example is that with the camera payload pointing to the side of the vehicle, and the user commanding forward along what was the original transversal axis, the actual vehicle will roll instead of pitch in order to move the vehicle in the direction the camera is pointing without any input or change from the operator from his original intent, making the system very intuitive to operate. The interpreted information can be outputted by the input mapping function block 320 in one or more data streams that includes information on the motion being controlled. For example, in some embodiments, whether the control inputs correspond to manual operation, autonomous operation, or both, the input mapping function block 320 can map the interpreted inputs to a common control data stream 310 that includes motion control information (e.g., linear velocity and/or angular velocity information) and/or other control information (e.g., information on auxiliary control functions) for the motion being controlled. In some embodiments, the common control data stream 310 is device independent. The common control data stream 310 can include motion information (e.g., information related to flying, driving (tracked vehicle and/or wheeled vehicle), hovering, tracking, positioning, manipulating, etc.) corresponding to a vehicle subsystem and/or a payload subsystem of the one or more unmanned systems being controlled. In some embodiments, the motion information can include one or more linear velocities (e.g., 1-, 2-, or 3-DOF corresponding to each linear axis) and/or one or more angular velocities (e.g., 1-, 2-, or 3-DOF corresponding to each axis of rotation).

The common control data stream 310 is received by behavior function blocks 330, 340 which process the motion control information in the common control data stream 310 into one or more behaviors. For example, behavior function blocks 340 can process motion control information corresponding to autonomous operation and behavior function block 330 can process motion control information corresponding to manual operation. "Behaviors" (whether from a human operator, a planned or predetermined autonomous mission, and/or an external source) can refer to a mode of control for an unmanned system or systems, including subsystems. As discussed above, the behaviors (or modes of control) can be modeled on a high level as manual operations or autonomous operations and, within each manual and autonomous operation category, the behaviors can be further modeled based on the type of motion being controlled. Manual (teleoperation) control operations are interpreted based on the operator's intent from received inputs from block 305 and subsequent input mapping block 320 and autonomous control operations are provided without operator intervention to the models (330 and 340) from an application running within the universal control architecture (whether on the local control device, on the expansion module or somewhere within the addressable network). The common control device (and/or another device) can create multiple instances of teleoperation behavior function block 330 and/or autonomous behavior function block 340 that correspond to each motion being controlled in the unmanned system(s). For example, each motion corresponding to a vehicle subsystem and/or a payload subsystem can be defined as a generic behavioral model that is device independent. The device-independent generic behavioral models allow the user to have a common control experience for each motion type (e.g., flying, driving (tracked and/or wheeled vehicles), hovering, tracking, positioning, manipulating, etc.) even if the unmanned systems are different.

As seen in FIG. 3, the common control data stream 310 can be input to the teleoperation behavior function block(s) 330 and/or the autonomous behavior function block(s) 340 which can provide a generic behavior or model of a motion (payload subsystem motion and/or vehicle subsystem motion) to be controlled. In some embodiments a model may be referred to as a movement control model. In some embodiments, the generic behaviors or models for autonomous function blocks can be based on a preprogrammed (e.g., predetermined) software/hardware function rather than from received inputs (indicated by dashed arrows as part of FIG. 3 block 340). Instances of the teleoperation function blocks can be created based on the vehicle and/or payload subsystem being controlled manually. For example, teleoperation behavior function block 330a can correspond to a generic hovering vehicle model for manual hover motion control, and teleoperation function block 330b can correspond to a generic skid steer vehicle model for manual track motion control. In addition, teleoperation function block 330c can correspond to a generic gimbal payload model for manual control of positioning motion. Similarly, instances of the autonomous function blocks can be created based on the vehicle and/or payload subsystem being controlled autonomously. For example, autonomous function block 340a can correspond to generic gimbal payload model for autonomous control of gimbal positioning/aligning motion, and autonomous function block 340b can correspond to a generic manipulator payload model (e.g., controlling an arm motion) for autonomous control of a robot arm motion on the ground vehicle 360c. Other instances of teleoperation and/or autonomous function blocks can be added based on the vehicle and/or payload subsystems that are being controlled by the common control device. An example of manual control operation would be a human operator providing proportional teleoperation commands from the control device to the locomotion capability of ground robot 360c through the skid steer platform vehicle model and subsequent platform conversion block 350c. An example of the autonomous control operation would be drone 360a automatically following and keeping in view ground robot 360c relative to drone 360 as camera field of view based on state (altitude, location, camera gimbal, etc.) and video data distributed to the software application that is running within the universal control architecture (whether on common control device, expansion module or within the addressable network). This software provides the automated commands to the required vehicle and payload models, blocks 340 and 330 to achieve the programmed behavior.

The generic models 330, 340 are configured to receive a common data stream 310, extract the relevant motion control information and/or other control information, and output generic motion control information and/or other control information to the corresponding platform conversion function blocks 350, which converts the generic device-independent control data to device-dependent control data specific to the unmanned system and/or subsystem being controlled. Each unique make and model of controlled subsystem will require a unique implementation of such conversion, as this is the interface between the abstraction of a subsystem to the specific subsystem being controlled. For example, generic hovering vehicle model 330a can receive the common control data stream 310 and extract the control data relevant to controlling a hovering vehicle (e.g., extracting the linear and/or angular velocity control data). The generic hover vehicle model 330a then converts the extracted common control data to generic control data (e.g., generic linear and/or angular velocity control data) corresponding to a generic hovering vehicle operation (e.g., device independent control data). The generic control data can be output to drone platform conversion function block 350a. The drone platform conversion function block 350a then converts the generic control data to hovering motion control data that is specific (e.g., device dependent) to the drone platform being controlled. The specific hovering motion control data can include linear and/or angular velocity data. In some embodiments, drone platform conversion function block 350a can convert the generic done motion commands to platform-specific attributes that can include applying constraints or limits on the generic motion control, such as, for example, control rate gains, rate limits, maximum operational altitude and/or velocity limits, etc. The generic hovering motion control data can then be transmitted to the drone 360a. Thus, because platform conversion function block 350 can translate the generic motion control data to the platform-specific attributes of the unmanned system being controlled, the generic behavior models 330, 340 can be the same for a variety of platforms (e.g., vehicle platforms and/or payload platforms). For example, in the above example, the same generic hovering vehicle model 330a can be used regardless of whether the hover subsystem belongs to UAS, sUAS, a nUAS, or some other unmanned drone system. This means that, from the user's point of view, a common control experience can be provided to the user regardless of the unmanned vehicle platform being controlled.

Other platform-conversion function blocks can provide similar functions as the drone platform conversion function block. For example, gimbal platform conversion function block 350b can convert the generic gimbal payload motion information from the generic gimbal payload models 330c or 340a to gimbal-specific positioning motion information (e.g., motion information for gimbals on UAVs, UGVs, etc.) for drone 360a, PZT camera 360b, and ground robot 360c; skid steer platform conversion block 350c can convert the generic skid steer motion information from the generic skid steer vehicle model 330b to specific skid steer vehicle motion information (e.g., vehicle motion information for UGV, sUGV, sUGV/EOD, etc.) for ground robot 360c; and manipulator platform conversion block 350d can convert the generic manipulator payload motion information from the generic manipulator payload model 330d to specific manipulator motion information (e.g., manipulator motion information for n-DOF manipulators on UAVs, UGVs, etc.) for ground robot 360c. Accordingly, because the user interacts with the device-independent generic models rather than the actual device-specific vehicle and/or payload subsystem of unmanned systems, the user can have the same control experience regardless of which device-specific vehicle and/or payload platform is being controlled.

In some embodiments, after the conversion to platform-specific motion control data, the common control device (and/or another device in the universal control architecture) can translate the converted motion data into the communication protocol used by the unmanned system being controlled. For example, protocol conversion function blocks (not shown in FIG. 3) can convert the output of the platform conversion functional block 350 to the proper protocol (e.g., MAVLink, JAUS, ROS, a proprietary protocol, or some other protocol) that is used by the corresponding unmanned system 360 being controlled. In addition, after conversion to the proper protocol, the common control device (and/or another device in the universal control architecture) can transmit (e.g., via either a wired and/or wireless system) the motion control data to the appropriate unmanned system 360.

In exemplary embodiments of the present disclosure, a behavioral control scheme as discussed above can exclusively control, or "claim," one or more functional subsystems such as, for example, a vehicle portion, a payload portion, and/or an A/V portion (e.g., A/V monitoring and/or transmitting portion) of the unmanned system. By claiming the subsystems to be controlled, the behavioral control scheme provides flexibility in controlling one or more of the unmanned systems such that one or more functional subsystems of each unmanned system can have autonomous control while one or more other functional subsystems of each unmanned system can be manually controlled. For example, a user may want to fly the unmanned drone system 360a by controlling the drone's position in space while keeping a specific visual target in the center of the drone's camera frame. The unmanned drone system 360a can have a vehicle subsystem that controls the flight operations of the drone, as well as a payload subsystem that includes a gimbal that controls an angular positioning of the camera along, for example, three axes. In this example, the control inputs by the user (e.g., using the common control device) to manually operate the motion of the vehicle portion of the drone will be interpreted as teleoperation "hover behavior" (e.g., by the input mapping function block 320) and mapped to a corresponding generic hover vehicle model (e.g., hover vehicle model 340a) that claims the vehicle subsystem and thus the flight operations of the unmanned done system 360a. In addition, control inputs and/or device/software inputs for a preprogrammed (or predetermined) autonomous mission (e.g., based on an application and/or plugin in the common control device and/or some other device) can be interpreted (e.g., by the input mapping function block 320) as an autonomous "visually track target behavior" and mapped to an autonomous generic gimbal payload model (e.g., gimbal payload model 340a) that claims the payload subsystem and thus the gimbal mechanism operation of the unmanned drone system 360a to visually track the target.

As another illustrative example of a behavioral control scheme, a simple ground robot (e.g., ground robot 360d) with two independently driven tracks might have a "drive" behavior that maps direction (e.g., forward) and angular velocity commands into motor velocities for the left and right tracks. As yet another example, a high degree-of-freedom robot manipulator might have a "manipulate" behavior can map end-effector velocities in cartesian task space to individual angular velocities for each joint. In accordance with disclosed embodiments, both control cases can be mapped to a "general" 6-DOF (three linear and three angular) movement principle, allowing each unmanned system to be operated in a common manner.

In addition to providing a common control experience regardless of the unmanned system platform, another reason for common abstraction of each unmanned system or subsystem, is to allow for intuitive teleoperation through control in the "task space", which results in translating the operator's intent (whether manual or autonomous) into, for example, motion of the vehicle and/or payload with respect to its principal 6DOF control axes and not controlling individual constituent articulations thereof (e.g., a robotic manipulator where the operator wants to move the end of the grasp mechanism attached to the end of the manipulator in 6DOF space directly and not have to be concerned with the 7 serially arranged revolute joints that comprise the manipulator). An example application where the universal control architecture determines the intent of the user is the controlling of a controller with a yoke to remotely operate an aircraft. To control the aircraft, the user pushes forward on the yoke to tilt the aircraft forward, right to roll the aircraft right, etc. It is as if the user is holding a model of the aircraft in their hand and moving the model in the way a real aircraft should move. The user's intent is translated to the aircraft's movement. The "translation" feature (e.g., as implemented by the input mapping function block 320) is particularly beneficial as the complexity of the unmanned system and/or of the robotic subsystems grows, especially if the systems are interdependent. For example, a robotic high degree of freedom manipulator mechanism can be very tedious to control by manually controlling the velocities of each joint. However, if the control system can abstract away the manipulator mechanism and allow direct command of the angular and translational velocities of the end effector of the manipulator arm, the complexity of the manipulator mechanism is mostly irrelevant. The operator dictates whether the universal control architecture is in autonomous or manual operation mode via input on the common control device. The described architecture in block 300 of FIG. 3, allows for multiple unmanned systems to be assigned autonomous tasks when the operator is manually operating a separate unmanned system. In some embodiments, the operator can manually control a grouping of multiple unmanned systems that are performing autonomous behaviors amongst each other. For example, multiple iterations of drone block 360*a* exist on the network and they are selected as a group of nUAS. The nUAS can be arranged, for instance, in a diamond pattern dispersed on the same plane whose formation is moderated by an autonomous function running within the universal command architecture (simultaneity of manual and autonomous functions describe above). The vehicles start in a stationary hover, and when the operator inputs a manual forward command, the formation beings to move collaboratively in the same forward direction. When the operator issues a roll command, the formation begins to move collectively in the direction the roll command was issued.

In some embodiments, the input mapping function block 320 can include a perspective function that takes into account which reference frame is being displayed on the common control device (e.g., a reference frame from the viewpoint of the unmanned system, a reference frame of the unmanned system being controlled but separate from the unmanned system, etc.) and the displayed reference frame is aligned with a reference frame of the common control device. For example, the disclosed universal command architecture enables the operator to control unmanned systems from whatever perspective the operator is currently viewing the system. If the operator is looking at a video feed from a camera mounted directly on a vehicle facing forward, the control inputs can be interpreted by the input mapping function block 320 as if the operator is "riding" in the vehicle. Thus, "forward" direction can mean to move "into" the screen that the operator is viewing because the screen's reference frame and perspective and the vehicle's reference frame and perspective are aligned (e.g., the same). However, if the operator is viewing the vehicle under control through another camera some distance meters away, the operator's inputs will be rotated such that "forward" means into the screen (which no longer means "forward" for the vehicle), and "left" means to the left side of the screen. Further, the rotation between the screen's perspective and the operator's perspective changes over time as the two systems move relative to each other. Thus, in accordance with disclosed embodiments, perspectives with respect to one frame may need to be mapped into another frame, for accurate translation. Perspective translation is achieved by applying the inverse of the coordinate frame rotation from the sensor capturing the user's presented perspective and the frame of the vehicle itself. In the trivial case, where the sensor is aligned with the vehicle, the rotation between the two is zero, meaning no translation is required. As the rotation of the vehicle deviates from the user's perspective, the inverse of that rotation is applied to the control inputs to maintain alignment between the user's control intent and the vehicle's interpretation of the command.

Because the disclosed architecture provides a data stream that has attitude and location information for one or more unmanned systems, sensors, and devices on the network, the disclosed architecture facilitates calculation of the transformation between any two attitude frames. Further, the disclosed architecture is also aware of sensors' lens characteristics, and therefore allows precise calculation of relative positions of objects in a sensor frame. Advantageously, this allows control of a controllable entity on the network from the perspective of another entity. Since the disclosed system has awareness of the location and rotation of all entities in the global frame, the translation of control inputs from any one frame into another is calculated simply by applying the inverse rotation between the frames as described above.

Figure 4:
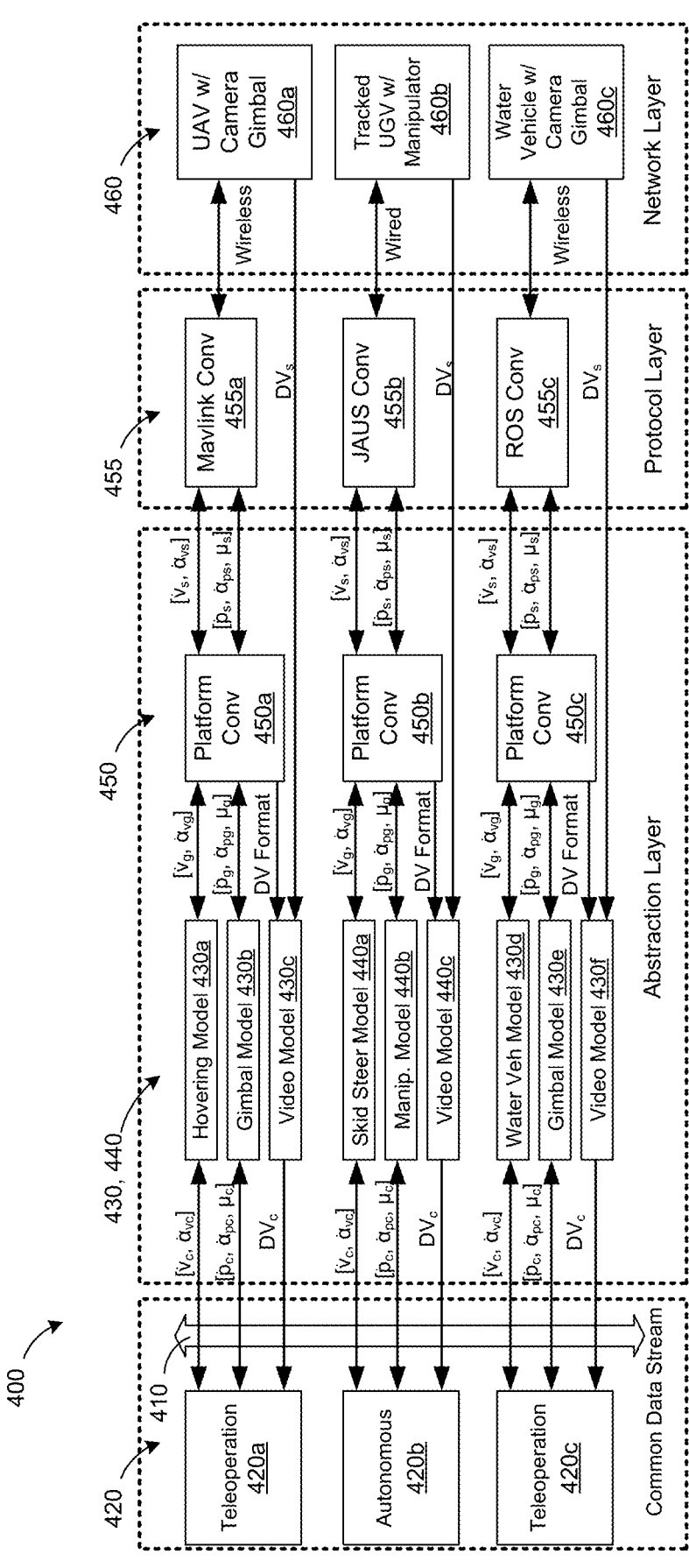
FIG. 4 shows a multi-layered representation of a universal control architecture with vehicle control models in accordance with an embodiment of the present disclosure.

In the above embodiments, the exemplary behavior models correspond to controlling a motion of an unmanned system with the control flow going from the common control device (and/or another device on network) to the unmanned system. However, in some embodiments, status information (e.g., linear and/or angular velocities) can be transmitted from the unmanned systems to the common control device (and/or another device on network) as, for example, feedback to the user and/or to the autonomous control system. In addition, behaviors the above embodiments related to modeling motion control information. However, in some embodiments, behaviors can also apply to non-motion related subsystems of unmanned systems such as, for example, subsystems related to monitoring and/or transmitting telemetry information (e.g., digital video, status information, etc.). For example, FIG. 4 shows a multi-layered control representation of a universal control architecture that includes several stages of translations of control data, status data, and/or audio/video data. In the disclosed architecture, function blocks 420, 430, 440, 450, and 455 correspond to various intermediate transformation stages that includes an abstraction layer, protocol translation layer, and network transport layer for processing the control, status, and/or audio/video data between a common control device and unmanned systems 460. Each layer serves abstracts an aspect of the controlled system or controller such that both are effective independent from the particular implementation of the other. The Abstraction Layer comprised of blocks 430, 440, and 450 abstract the user's control intent for a generic subsystem, and then maps the generic subsystem to a specific platform model. The Protocol layer (455) abstracts the physical implementation of the controlled system from the platform model. Finally, the network layer (460) abstracts the physical connection of the robot to the controller.

FIG. 4 shows a more detailed view 400 of the functions discussed above with respect to FIG. 3. However, while the embodiment of FIG. 3 provides an overview of the control data flow from the common control device to the unmanned systems, FIG. 4 shows an overview of the control data flow from the common control device to the unmanned systems (and vice-versa depending in the type of control system) and the status and/or A/V data flow from the unmanned systems to the common control device (and vice-versa depending in the type of control system). The status data can include data corresponding to location information, position information, attitude information, and/or other status information, and the A/V data can include video and/or audio from the unmanned systems (e.g., in digital format). At each stage, the translations can be model-generated transformations of the control, status, and/or A/V data that are transmitted between a common control device and one or more unmanned systems. Although FIG. 4 shows the A/V data as being one-directional from the unmanned systems to the common control device, in some embodiments, the A/V data can also be transmitted from the common control device (and/or another device on the network) to the unmanned device (e.g., the unmanned device can have speakers that can broadcast a warning from the user to persons in the vicinity of the unmanned device).

I/O function block 420 shows the transformations on the control inputs corresponding to teleoperation (e.g., inputs provided by a common control device 120, 220) and/or automation (e.g., inputs provided by a software and/or device functions). I/O function block 420 shows input mapping functions similar to those of input mapping function block 320 of FIG. 3 but, along with input mapping functions, the I/O function block 420 also includes output mapping functions that map status and/or A/V data from the unmanned systems (and/or another device on the network) to an A/V component used by the user (e.g., a display and/or audio jacks/speakers on the common control device). I/O function block 420 includes two I/O subblocks 420*a* and 420*c* corresponding to instances where the common control device (e.g., common control device 120 and/or 220) and/or another device has interpreted inputs as teleoperations (e.g., manual control) and one instance I/O subblock 420*b* corresponding to an instance where the inputs are interpreted as an autonomous operation. Of course, in other embodiments, there can be any number of teleoperation function blocks and autonomous function blocks depending on the number unmanned systems being controlled and the mode of operation for each unmanned system or functional subsystem. The abstraction layer interprets the control intent from the user and converts it to a control command for an abstract agent type (vehicle, payload, etc.). The control intent is interpreted based on the user's selected control mode for the agent type. For example, the user may choose to drive a robot using its Skid-steer mode, then switch control modes to Manipulate to route user input to the onboard manipulator arm. Control modes are not limited to single subsystems, as modes may control two or more subsystems to perform coordinated motion. For example, if a robot has a manipulator arm that is not capable of rotating horizontally, the Manipulate control mode may interpret input horizontal rotation to command rotation of the entire robot, while interpreting other axes of input to command the joints of the robot arm.

In the embodiment of FIG. 4, I/O subblock 420*a* can provide manual control of an unmanned drone system 460*a*, including manual control of both the vehicle subsystem and the payload subsystem. Similarly, I/O subblock 420*c* can provide manual control of an unmanned water vehicle system 460*c*, including manual control of both the vehicle subsystem and the payload subsystem. In this scenario, the operator can selectively operate the drone system 460*a* or the water vehicle system 460*c* using a common control device. In contrast, I/O subblock 420*b* can provide autonomous control of tracked ground vehicle system 460*b*, including autonomous control of both the vehicle subsystem and the payload subsystem. Thus, in the system described above, an exemplary scenario can be that, while the user manually operates the drone 460*a* the tracked ground vehicle 460*b* has a predetermined autonomous function to automatically follow the drone's position and/or an area where the drone's camera is manually pointing to. Of course, the vehicle and payload subsystems in each of the unmanned vehicle can have any combination of teleoperation or autonomous control, depending on the scenario. For example, similar to the example given above with respect to FIG. 3, the control of one or more vehicle subsystems in each unmanned system can be manual while the control of one or more payload subsystems can be autonomous.

In some embodiments, the inputs in the respective I/O function blocks 420*a-c* are machine-translated into generalized, uniform set of data such as, for example, a set of state variables. The input data (e.g., set of state variables) can then be interpreted by behavior function blocks 430, 440 and modeled as generic behaviors of subsystems of unmanned systems (e.g., flying, driving (tracked and/or wheeled vehicles), hovering, tracking, positioning, manipulating, etc.). The behavioral function blocks 430, 440 convert the generalized common control data into generic vehicle and/or payload motion control data for the specific desired motion. In addition, behavioral function blocks 430, 440 convert the generic status and/or AV data from the vehicle and/or payload subsystems into a generalized common status and/or AV data that can be output by the common control device (and/or another device on the network). As seen on FIG. 4, the outputs (e.g., motion control data) of the I/O subblocks 420*a*, 420*b*, and 420*c* can be transmitted to a common I/O data stream 410 that can be input to teleoperation behavior function blocks 430 (e.g., function blocks 430*a-f*) and/or autonomous behavior function block 440 (e.g., function blocks 440*a-c*), and the outputs from the behavior function blocks 430, 440 can be transmitted to the common I/O data stream 410 that can be input to the I/O function blocks 420. For clarity, FIG. 4 shows how individual data streams are transmitted between the I/O function blocks 420 and the behavior function blocks 430, 440. In some embodiments, instead of a common data stream, one or more separate data streams can be used to between the I/O function blocks 420 and the respective behavior function blocks 430, 440.

Similar to the embodiment in FIG. 3, the behavioral function blocks 430, 440 output the generic vehicle and/or payload motion control data to a platform conversion function block 450 that converts the generic vehicle and/or payload motion control data into the platform-specific vehicle and/or payload motion control data for the specific hardware/software of the unmanned system being controlled. In addition, in the embodiment of FIG. 4, information (e.g., status and/or A/V data) received from the unmanned system can be converted from the platform-specific format used by the unmanned system into a generic format by the platform conversion function block 450. The generic format is then converted to a common format, as discussed above. After conversion to the platform-specific vehicle and/or payload motion control data, protocol function control block 455 converts the platform-specific data to the proper protocol (e.g., Mavlink, JAUS, ROS, a proprietary protocol, or some other protocol) for transmittal to the unmanned systems 460. In addition, information (e.g., status and/or A/V data) received from the unmanned system can be converted from the protocol used by the unmanned system into a generic format that is then converted, as discussed above.

As indicated above, in some embodiments, the inputs to the behavioral function blocks 430, 440 can be a set of state variables. Using state variables can be beneficial because their use removes the need for behavioral function blocks to "know" the exact details of the input device (e.g., common control device 120, 220 and/or another device). State variables are the purest abstraction of the control intent, as well as the purest abstraction of the controlled system's state. By operating on these abstractions rather than the specific implementation of each system, the peculiarities of each are irrelevant and any element in the system can be replaced with a different implementation as long as its state information can be expressed in these state variables. For example, a set of state variables $[\dot{v}, \dot{a}_v]$ can represent the linear vehicle velocities and/or angular vehicle velocities, respectively, of the vehicle subsystem. In some embodiments, the vehicle velocities can represent, for example, 6-DOF and include control and/or status information. Another set of state variables $[\dot{p}, \dot{a}_p, \mu]$ can represent the linear payload velocities, angular payload velocities, and/or auxiliary control functions (e.g., functions controlling non-moving equipment and/or other equipment on the unmanned system), respectively, of the payload subsystem. In some embodiments, the vehicle velocities can represent, for example, 6-DOF and include control and/or status information.

As seen in FIG. 4, behavioral function block 430a can be configured as a generic hovering vehicle model to provide motion control data for the vehicle subsystem of drone system 460a. Behavioral function block 430a can receive a set of state variables $[\dot{v}_c, \dot{a}_{vc}]$ (where the subscript c represents common data) from common I/O data stream 410. The behavioral function block 430a converts the common set of state variables $[\dot{v}_c, \dot{a}_{vc}]$ to a generic hover motion control data. The output of the behavioral function block 430a is a set of vehicle velocity state variables $[\dot{v}_g, \dot{a}_{vg}]$ (where the subscript g represents generic data) representing the generic hover motion control data, which is then transmitted to platform conversion block 450a. Platform conversion function block 450a converts the received generic vehicle velocity state variables $[\dot{v}_g, \dot{a}_{vg}]$ to platform-specific vehicle velocity state variables $[\dot{v}_s, \dot{a}_{vs}]$ (where the subscript s represents platform-specific data). Finally, the platform-specific vehicle velocity state variables $[\dot{v}_s, \dot{a}_{vs}]$ are converted to the proper protocol by protocol conversion function block 455a and transmitted of the unmanned drone system 460a for control of the hover vehicle subsystem.

Similarly, the behavioral function block 430b can be configured as a generic gimbal model to provide motion control data for the payload subsystem of drone system 460a to, for example, position a camera. Behavioral function block 430b can receive a set of state variables $[\dot{p}_c, \dot{a}_{pc}, \mu_c]$ from common I/O data stream 410. The behavioral function block 430b converts the common set of state variables $[\dot{p}_c, \dot{a}_{pc}, \mu_c]$ to a generic gimbal motion control data. In addition, common auxiliary control information can be transmitted to provide other non-motion related functions such, for example, as operating a camera and/or controlling other equipment on the unmanned system. The output of the behavioral function block 430b is a set of generic payload velocity state variables $[\dot{p}_g, \dot{a}_{pg}, \mu_g]$ and generic auxiliary control information representing the generic gimbal motion control data and/or other auxiliary control data, which is then transmitted to platform conversion block 450a. Platform conversion function block 450a converts the received generic payload velocity state variables $[\dot{p}_g, \dot{a}_{pg}, \mu_g]$ and/or the generic auxiliary control data to platform-specific payload velocity state variables $[\dot{p}_s, \dot{a}_{ps}, \mu_s]$ and/or auxiliary control data. Finally, the platform-specific payload velocity state variables $[\dot{p}_s, \dot{a}_{ps}, \mu_s]$ and/or auxiliary control data are converted to the proper protocol by protocol conversion function block 455a and transmitted of the unmanned drone system 460a for control of the gimbal payload subsystem. In the above embodiment, the platform conversion function block 450a and the protocol conversion function block 455a are common to both the vehicle and payload control scheme for the unmanned done system 460a. However, one or both the platform conversion function block 450a and the protocol conversion function block 455a can be separate function blocks in other embodiments. In some embodiments, one or more behavioral function models (e.g., function blocks 430a-f, 440a-c) can be combined with another behavioral function model, depending on a desired control scheme. For example, an unmanned system in which the vehicle and payload subsystems are interrelated can have a behavioral function model that takes into account the inter-related motions of these subsystems. Those skilled in the art will recognize that the state variable conversions for unmanned systems 460b and 460c are similar and thus, for brevity, a detailed discussion is omitted.

Along with translating control data from a common control device to the unmanned system being controlled, the universal control architecture shown in FIG. 4, includes several stages of translations to convert status and/or A/V data from the unmanned systems to the common control device (and/or another device on the network) for outputting the status and/or A/V data (e.g., in a display, audio jacks, speakers, Bluetooth, and/or another A/V device). When transmitting the status and/or A/V data to the network, the function blocks 430, 440, 450, and 455 perform the reverse functions. For example, protocol conversion block 455 can convert status and/or A/V information in the protocol-specific format to a platform-specific format (e.g., when state variables are used, into state variables $[\dot{v}_s, \dot{a}_{vs}]$ and/or state variables $[\dot{p}_s, \dot{a}_{ps}, \mu_s]$), that can be read by the platform conversion function block 450, which then converts the status and/or A/V information in the platform-specific format into a generic format (e.g., when state variables are used, from state variables $[\dot{v}_s, \dot{a}_{vs}]$ and/or state variables $[\dot{p}_s, \dot{a}_{ps}, \mu_s]$ into respective state variables $[\dot{v}_g, \dot{a}_{vg}]$ and/or state variables $[\dot{p}_g, \dot{a}_{pg}, \mu_g]$). The behavioral function blocks 430, 440 can receive the status and/or A/V information in the generic format and convert them into a common format (e.g., when state variables are used, from state variables $[\dot{v}_g, \dot{a}_{vg}]$ and/or state variables $[\dot{p}_g, \dot{a}_{pg}, \mu_g]$ into respective state variables $[\dot{v}_c, \dot{a}_{vc}]$ and/or state variables $[\dot{p}_c, \dot{a}_{pc}, \mu_c]$). The status and/or A/V information in the common format can be output (e.g., displayed, audio playback, etc.) to the user, as discussed above. In some embodiments, when status and/or A/V information that is converted by the platform conversion block 450 can be output in a digital-video format (DV format information). The DV formation information can be converted by a behavior function block 430 (e.g., video format conversion model function block 430c) into a common DV format information ($DV_c$) that can be output to the user using a common control device (and/or another device on the network). In some embodiments, the unmanned subsystems can transmit A/V information in a specific digital-video format ($DV_s$) directly to the video format conversion model function block 430c, which then convers the specific DV format information to the common DV format information for output to the user. Those skilled in the art will recognize that the DV format conversions for unmanned systems 460b and 460c are similar and thus, for brevity, a detailed discussion is omitted.

Figure 5:
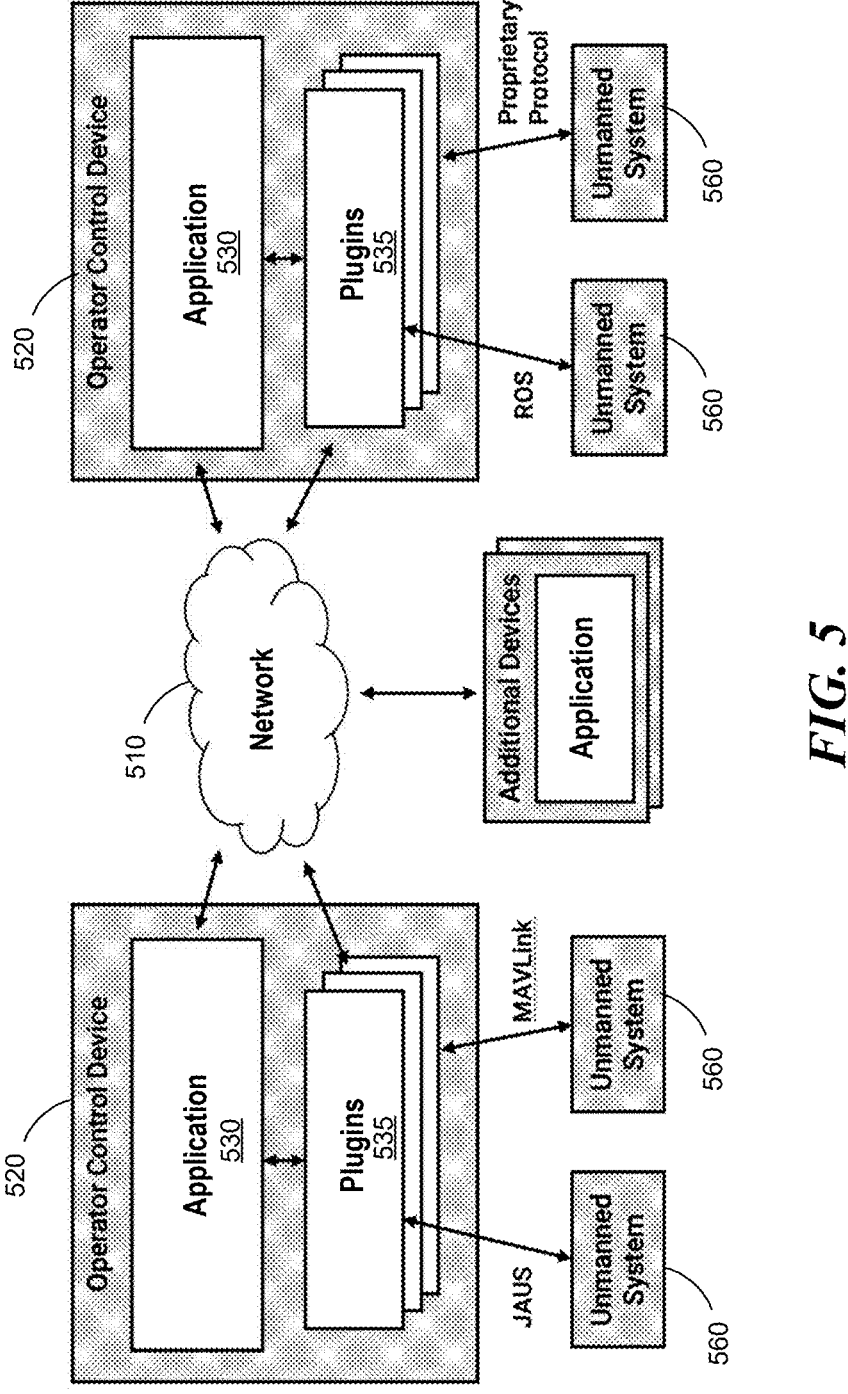
FIG. 5 shows a common network providing connectivity to multiple unmanned systems in accordance with an embodiment of the present disclosure.

FIG. 5 shows a common network 510 providing connectivity to multiple unmanned systems 560, which can be one or more of the unmanned systems discussed above and/or other unmanned systems. The common network 510 is accessible by multiple unmanned systems 560 and input devices (e.g., operator control devices 520). For example, a first input device can control/operate a first pair of unmanned systems while a second input device can control/operate a second pair of unmanned systems. The first pair of unmanned systems are configured to use native protocols such as, for example, JAUS and MAVLink for communication with the first input device. The second pair of unmanned systems are configured to use, for example, ROS and proprietary protocols for communication with the second input device. The input devices can be configured to run one or more applications 530 and one or more plugins 535. The applications 530 and plugins 535 can communicate with one another and with the network 510 using, for example, a proprietary communication protocol. The plugins 535 can be created by, for example, third parties to communicate with other robotic control protocols such as ROS, JAUS, MAVLink, or vendor-specific proprietary protocols. Typically, the plugins include implementations of the interface to a specific controlled system including its messaging protocol and peculiarities of the controlled system. That is, the plugins 535 can be regarded as logical bridges between applications 530 and each unmanned system's native control protocol. Advantageously, the architecture shown in FIG. 5 is agnostic to the physical transport of the unmanned systems' native protocol. For example, the system may be deployed using an IEEE 802.11 WiFi network, a proprietary mobile ad-hoc network (MANET), or a cellular network with no change to the architecture or software implementation. Like behaviors which abstract input device details from input state variables, Plugins abstract the implementation details of each unmanned system from the rest of the architecture. Each unmanned system communicates with the network exclusively through its component Plugins. FIG. 5 also shows that additional devices running applications can communicate with the network.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

FIG. 6 is a flowchart of operations for using the universal control architecture to control one or more unmanned vehicles in accordance with an embodiment of the present disclosure. The operations discussed in connection to FIG. 6 may be performed on operator control device 520. At 602, operator control device 520 receives a command to control an unmanned vehicle. Operator control device 520 may receive the command from an autonomous command user input interface (e.g., hover) or may receive the command from a manual input user interface (e.g., from a joystick type of a device).

At 604, operator control device 520 determines a plurality of movement control models for controlling the unmanned vehicle. For example, when the unmanned vehicle was added to the system, the setup routine may have added a data structure to the system representing the unmanned vehicle. The data structure may include one or more movement control models or links to instances of one or more movement control models for the particular unmanned vehicle. Thus, operator control device 520 may retrieve the data structure from memory to have access to the movement control models. In some embodiments, each movement control model may be an application programming interface (API) that may accept as input various command parameters.

At 606, operator control device 520, determines one or more movement control models required to execute the command. For example, operator control device 520 may process the command and determine which movement control model (or models) are required to execute the command.

For example, the command may be an autonomous mode command that instructs an unmanned vehicle to hover and capture video of a particular position or location. Operator control device 520 may determine that the unmanned vehicle should fly to the position or location, then hover at that location while capturing video. Operator control device 520 may retrieve the flying movement control model, the hover movement control model and the gimbal movement control model associated with the unmanned vehicle. Operator control device 520 may then input the coordinates of the position and location into the flying movement control model to instruct the unmanned vehicle to fly to the particular location. In the instances where the unmanned vehicle is a ground vehicle, operator control device 520 may retrieve a driving movement control model and input the coordinates of the position into that model.

When the unmanned vehicle arrives at the coordinates, operator control device 520 may retrieve the control model for performing the task. For example, operator control device 520 may retrieve the hover control model and input the hover coordinates into the model. In addition, operator control device 520 may retrieve the gimbal control model and rotate the camera into the appropriate position to capture the video/photo data.

At 608, operator control device 520 translates the command into a set of movement instructions for the unmanned vehicle. For example, as discussed above, operator control device 520 may input the command or portion of the command into one or more appropriate movement models and may receive from the one or more movement models a set of movement instructions. At 610, operator control device 520 transmits the set of movement instructions to the unmanned vehicle. For example, operator control device 520 may use one or more networks to perform the transmission.

Various modifications to the disclosed embodiments will be apparent to those skilled in the art, and the general principals set forth below may be applied to other embodiments and applications. Thus, the present disclosure is not intended to be limited to the embodiments shown or described herein.

FIG. 7 is a flowchart of operations for using the universal control architecture to add unmanned vehicles to be controlled in accordance with an embodiment of the present disclosure. At 702, operator control device 520 detects an unmanned vehicle within a vicinity. For example, the unmanned vehicle may include a wireless transceiver that may broadcast a signal (e.g., including an identifier associated with the unmanned vehicle). The unmanned vehicle may include a payload device (e.g., a camera or another device attached to a gimbal). In some embodiments, the unmanned vehicle may include a port for plugging in a wire to establish communications between the unmanned vehicle and the common command and control architecture. Thus, an operator may plug a wire into the unmanned vehicle and the operator control device 520. When the wire is plugged in, operation control device 520 may detect the unmanned vehicle.

At 704, operator control device 520 transmits an identification request to the unmanned vehicle. For example, operation control device 520 may broadcast a wireless signal requesting identification information. The signal may be received by the transceiver on the unmanned vehicle. In some embodiments, the detection and identification request may be performed using a wired connection. For example, operation control device 520 may be connected to the unmanned vehicle using a wire and the signals may be transmitted back and forth over that wire. The identification request may be formatted according to the model of the unmanned vehicle, which may be detected when the unmanned vehicle is detected.

At 706, operator control device 520 receives indications of movement types associated with the unmanned vehicle and additional vehicle information. Each movement type may be associated with one or more movement commands supported by the unmanned vehicle. For example, the operator control device 520 may receive a data structure that includes a plurality of movement types supported by the unmanned vehicle. The data structure may be in a form of a data file that operator control device 520 is able to process. For example, if the unmanned vehicle is an unmanned aerial vehicle, the unmanned vehicle may support hovering commands, flying commands, etc. Thus, the data structure may include flying and hovering commands supported by the unmanned vehicle. If the unmanned vehicle is an unmanned water vehicle, movement commands may include underwater operating commands, above-water operating commands, etc. Those movement commands may be part of the data structure received by operator control device 520.

In some embodiments, vehicle information may include payload types associated with the unmanned vehicle and/or communication protocol associated with the unmanned vehicle. Thus, the data structure may include payload movement commands. Payload movement commands may be marked within the data structure to differentiate those commands from vehicle movement commands. Furthermore, the data structure may include an indicator of a communication protocol supported by the unmanned vehicle. For example, the payload types may include a gimbal (e.g., for rotating an attached device). Another payload type may be a camera attached to the gimbal (e.g., the camera may have its own payload movement control model for zooming, etc.). The communication protocol may be a protocol supported by the unmanned vehicle (e.g., MAVLink, JAUS, ROS, etc.)

At 708, operator control device 520 determines one or more movement control models for moving the unmanned vehicle. Each movement control model translates operator commands into movement instructions for the unmanned vehicle. In some embodiments, operator control device 520 may perform the following operations when determining the one or more movement control models. As described above, operation control device 520 may receive, from the unmanned vehicle, a plurality of supported movement commands and may match the plurality of supported movement commands with the one or more movement control models. Operation control device 520 may store a listing of movement commands and corresponding control model(s) that support those commands.

At 710, operator control device 520 may then assign, to an unmanned vehicle object, the one or more movement control models that match the plurality of supported movement commands. For example, a flight movement control model may be associated with commands such as fly forward, fly backwards, fly right, fly right, etc. If the received data structure includes those commands (e.g., as commands supported by the unmanned vehicle), operator control device 520 may assign the flight movement control model to the unmanned vehicle. In some embodiments, operation control device 520 may try to identify a least number of movement control models that may cover all the movement commands supported by the unmanned vehicle.

In one example, if the unmanned vehicle supports hovering as a movement type, operation control device 520 may assign a hovering movement control model to the unmanned vehicle object corresponding to the unmanned vehicle. In another example, if the unmanned vehicle support flight as a movement type, operation control device 520 may assign a flight movement control model to the object. In some embodiments, if the unmanned vehicle is a skid-steer vehicle, operation control device 520 may assign a skid-steer control model to the unmanned vehicle.

In some embodiments, operation control device 520 may generate a new movement control model based on the commands supported by the unmanned vehicle. Operation control device 520 may determine that a first movement control model matches a first portion of the plurality of supported movement commands and a second movement control model matches a second portion of the plurality of supported movement commands. For example, a particular movement control model may match some commands while another movement control model may match other commands. Thus, operation control device 520 may generate a new movement control model that includes a first application programming interface for the first portion of the plurality of supported movement commands and a second application programming interface for the second portion of the plurality of supported movement commands. That is, each movement control model may be a data structure (e.g., an API data structure) that supports particular commands (e.g., translates particular commands into movement instructions). Each of the commands may be split off from the movement control model to generate a new movement control model.

In some embodiments, operation control device 520 may determine a payload movement control model for moving the payload device associated with the unmanned vehicle. For example, if the unmanned vehicle includes a gimbal and a mounted camera, operation control device 520 may assign a gimbal movement control model and a camera control model to the unmanned vehicle. The gimbal movement control model may translate instructions from the user (e.g., rotate up, rotate down, rotate left, etc.) into instructions for the gimbal. Thus, operation control device 520 may assign the one or more movement control models to the unmanned vehicle. The control may also assign the payload movement control model(s) and the communication protocol to the unmanned vehicle. At 712, operation control device 520 controls the unmanned vehicle using the one or more movement control models and may control the payload(s) using payload movement control model(s).

In some embodiments, operation control device 520 may receive, from the unmanned vehicle, a plurality of supported payload commands and match the plurality of supported payload commands with one or more payload movement control models. For example, operation control device 520 may store a listing of payload movement commands and corresponding payload movement control model(s) that support those commands. Operation control device 520 may then assign to an unmanned vehicle object, the one or more payload movement control models that match the plurality of supported payload commands.

Operation control device 520 may test the assigned movement control models. In particular, operation control device 520 may generate a plurality of test commands for the unmanned vehicle. Each test command of the plurality of test commands may test a particular movement control model or a payload movement control model. For example, operation control device 520 may generate a command the instructs the unmanned aerial vehicle to hover at particular coordinates. In another example, operation control device 520 may instruct an unmanned ground vehicle to drive to particular coordinates. The test may also include testing the payload device. Thus, a test command may instruct a gimbal to rotate a certain number of degrees.

Operation control device 520 may translate, using the one or more movement control models, the plurality of test commands into a plurality of sets of movement instructions for the unmanned vehicle. For example, operation control device 520 may input the command into an appropriate movement control model and receive a corresponding set of movement instructions. Operation control device 520 may then format the plurality of sets of movement instructions according to a communication protocol associated with the unmanned vehicle. For example, if the protocol supported by the unmanned vehicle is MAVLink, operation control device 520 may format the set of instructions according to the MAVLink protocol. Operation control device 520 may then transmit the plurality of sets of movement instructions formatted according to the communication protocol to the unmanned vehicle.

In some embodiments, operation control device 520 may receive, from the unmanned vehicle, position information resulting from execution of the plurality of sets of movement instructions. For example, the position information may be geographic coordinates of a hovering unmanned aerial vehicle. In another example, the position information may be geographic coordinates of an unmanned ground vehicle.

Operation control device 520 may then determine, based on the one or more movement control models, expected position information associated with the unmanned vehicle. For example, operation control device 520 may determine, based on output from the movement control model, that after executing the test command, the unmanned vehicle should be located at a particular set of coordinates. Thus, operation control device 520 may determine, based on the expected position information and the position information from the unmanned vehicle, whether the plurality of sets of instructions moved the unmanned vehicle into an expected position. For example, if the geographic coordinates of the unmanned vehicle match the expected coordinates of the unmanned vehicle, operation control device 520 may determine that the test command(s) were successful. If there is no match, operation control device 520 may notify the operator that there has been an error with the unmanned vehicle on-boarding process.

Operation control device 520 may also test the assigned payload movement control model(s). For example, operation control device 520 may test the gimbal device attached to the unmanned vehicle. Operation control device 520 may receive, from the unmanned vehicle, payload orientation information resulting from execution of a set of instructions for moving a payload device. In some embodiments, the payload orientation information may be determined based on geographic location of the unmanned vehicle and instrument readings (e.g., heading, orientation, etc. using, for example, a gyroscope, magnetometer, etc.).

Operation control device 520 may determine, based on a payload movement control model, expected orientation information associated with the payload device. For example, operation control device 520 may input the test command into the appropriate model and receive back an expected orientation of the payload device. Operation control device 520 may then determine, based on the expected orientation information and the payload orientation information from the unmanned vehicle, whether the set of instructions moved the payload device into an expected orientation.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for adding unmanned vehicles to a common command and control architecture, the system comprising:
  one or more processors; and
  a non-transitory computer-readable storage medium storing instructions, which when executed by the one or more processors cause the one or more processors to:
    detect a signal from an unmanned vehicle within a vicinity of a controller, wherein the unmanned vehicle comprises a payload device;
    in response to detecting the signal from the unmanned vehicle, transmit an identification request to the unmanned vehicle, wherein the identification request requests identification information associated with the unmanned vehicle;
    receive, in response to the identification request, vehicle information, wherein the vehicle information comprises movement types supported by the unmanned vehicle, payload types supported by the unmanned vehicle, and communication protocol associated with the unmanned vehicle;
    determine, based on processing the movement types and the payload types with each movement type associated with movement commands received from the unmanned vehicle, a plurality of movement control models for moving the unmanned vehicle, a payload movement control model for moving the payload device associated with the unmanned vehicle, wherein two or more movement control models of the plurality of movement control models include overlapping commands, and wherein each movement control model translates operator commands into movement instructions for the unmanned vehicle or the payload device;
    select, from the plurality of movement control models, a subset of the plurality of movement control models comprising a least number of movement control models that cover all movement commands supported by the unmanned vehicle;
    assign, the subset of the plurality of movement control models, the payload movement control model, and the communication protocol to an unmanned vehicle object; and
    control, via each corresponding set of instructions, the unmanned vehicle using the subset of the plurality of movement control models.

2. The system of claim 1, wherein the instructions, when executed by the one or more processors, further cause the one or more processors to:

receive, from the unmanned vehicle, position information resulting from execution of plurality of sets of test movement instructions associated with a test command;
  determine, based on one or more test movement control models and the payload movement control model, expected position information associated with the unmanned vehicle; and
  determine, based on the expected position information and the position information from the unmanned vehicle, whether the plurality of sets of the test movement instructions moved the unmanned vehicle into an expected position.

3. The system of claim 1, wherein the instructions for determining, based on the vehicle information, the plurality of movement control models and the payload movement control model, when executed by the one or more processors, further cause the one or more processors to:
  receive, from the unmanned vehicle, a first plurality of supported movement commands and a second plurality of supported payload commands;
  match the first plurality of supported movement commands with the plurality of movement control models and the second plurality of supported payload commands with one or more payload movement control models; and
  assign, to the unmanned vehicle object, the plurality of movement control models that match the first plurality of supported movement commands and the one or more payload movement control models that match the second plurality of supported payload commands.

4. The system of claim 3, wherein the instructions, when executed by the one or more processors, further cause the one or more processors to:
  determine that a first movement control model matches a first portion of the first plurality of supported movement commands and a second movement control model matches a second portion of the first plurality of supported movement commands; and
  generate a new movement control model comprising a first application programming interface for the first plurality of supported movement commands and a second application programming interface for the second portion of the first plurality of supported movement commands.

5. A method comprising:
  detecting a wireless signal being broadcast by an unmanned vehicle within a vicinity of a controller;
  in response to detecting the wireless signal being broadcast by the unmanned vehicle, transmitting an identification request to the unmanned vehicle, wherein the identification request requests identification information associated with the unmanned vehicle and is formatted according to a model of the unmanned vehicle;
  receiving, in response to the identification request from the unmanned vehicle, movement types associated with the unmanned vehicle, wherein each movement type is associated with a movement command supported by the unmanned vehicle;
  determining, based on processing the movement types received from the unmanned vehicle, a plurality of movement control models for moving the unmanned vehicle, wherein two or more movement control models of the plurality of movement control models include overlapping commands, and wherein each movement control model translates operator commands or automation inputs into movement instructions for the unmanned vehicle;

selecting, from the plurality of movement control models, a subset of the plurality of movement control models comprising a least number of movement control models that cover all movement commands supported by the unmanned vehicle;

assigning the subset of the plurality of movement control models to the unmanned vehicle; and controlling the unmanned vehicle using the subset of the plurality of movement control models.

6. The method of claim 5, further comprising:

receiving in response to the identification request, payload types associated with the unmanned vehicle and a communication protocol associated with the unmanned vehicle;

determining, based on the payload types, a payload movement control model for moving or controlling state of a payload device mounted on the unmanned vehicle, wherein the payload movement control model translates payload movement commands into payload movement instructions for the payload device mounted onto the unmanned vehicle;

assigning the payload movement control model to the unmanned vehicle; and controlling the payload device mounted on the unmanned vehicle using the payload movement control model.

7. The method of claim 5, further comprising:

generating a plurality of test commands for the unmanned vehicle, wherein each test command of the plurality of test commands tests a movement control model;

translating, using one or more movement control models of the plurality of movement control models, the plurality of test commands into a plurality of sets of test movement instructions for the unmanned vehicle;

formatting the plurality of sets of the movement instructions according to a communication protocol associated with the unmanned vehicle; and transmitting the plurality of sets of the test movement instructions formatted according to the communication protocol to the unmanned vehicle.

8. The method of claim 7, further comprising:

receiving, from the unmanned vehicle, position information resulting from execution of the plurality of sets of the test movement instructions;

determining, based on the one or more movement control models, expected position information associated with the unmanned vehicle; and determining, based on the expected position information and the position information from the unmanned vehicle, whether the plurality of sets of instructions moved the unmanned vehicle into an expected position.

9. The method of claim 5, further comprising:

receiving, from the unmanned vehicle, payload orientation information resulting from execution of a set of instructions for moving a payload device;

determining, based on a payload movement control model, expected orientation information associated with the payload device; and determining, based on the expected orientation information and the payload orientation information from the unmanned vehicle, whether the set of instructions moved the payload device into an expected orientation.

10. The method of claim 5, wherein determining the plurality of movement control models further comprises:

receiving, from the unmanned vehicle, a plurality of supported movement commands;

matching the plurality of supported movement commands with the plurality of movement control models; and assigning, to an unmanned vehicle object, the plurality of movement control models that match the plurality of supported movement commands.

11. The method of claim 10, further comprising:

determining that a first movement control model matches a first portion of the plurality of supported movement commands and a second movement control model matches a second portion of the plurality of supported movement commands; and generating a new movement control model comprising a first application programming interface for the first portion of the plurality of supported movement commands and a second application programming interface for the second portion of the plurality of supported movement commands.

12. The method of claim 5, wherein further comprising:

receiving, from the unmanned vehicle, a plurality of supported payload commands;

matching the plurality of supported payload commands with one or more payload movement control models; and assigning, to an unmanned vehicle object, the one or more payload movement control models that match the plurality of supported payload commands.

13. A non-transitory, computer-readable medium storing instructions for adding unmanned vehicles to a common command and control architecture, the instructions when executed by one or more processors, cause the one or more processors to perform operations comprising:

detecting a wireless signal being broadcast by an unmanned vehicle within a vicinity of a controller;

in response to detecting the wireless signal being broadcast by the unmanned vehicle, transmitting an identification request to the unmanned vehicle, wherein the identification request requests identification information associated with the unmanned vehicle and is formatted according to a model of the unmanned vehicle;

receiving movement types associated with the unmanned vehicle, wherein each movement type is associated with a movement command supported by the unmanned vehicle;

determining, based on processing the movement types received from the unmanned vehicle, a plurality of movement control models for moving the unmanned vehicle, wherein two or more movement control models of the plurality of movement control models include overlapping commands, and wherein each movement control model translates operator commands into movement instructions for the unmanned vehicle;

selecting, from the plurality of movement control models, a subset of the plurality of movement control models comprising a least number of movement control models that cover all movement commands supported by the unmanned vehicle;

assigning the subset of the plurality of movement control models to the unmanned vehicle; and controlling the unmanned vehicle using the subset of the plurality of movement control models.

14. The non-transitory, computer-readable medium of claim 13, wherein the instructions further cause the one or more processors to perform operations comprising:

receiving in response to the identification request, payload types associated with the unmanned vehicle and a communication protocol associated with the unmanned vehicle;

determining, based on the payload types, a payload movement control model for moving a payload device mounted on the unmanned vehicle, wherein the payload movement control model translates payload movement commands into payload movement instructions for the payload device mounted onto the unmanned vehicle;

assigning the payload movement control model to the unmanned vehicle; and controlling the payload device mounted on the unmanned vehicle using the payload movement control model.

15. The non-transitory, computer-readable medium of claim 13, wherein the instructions further cause the one or more processors to perform operations comprising:

generating a plurality of test commands for the unmanned vehicle, wherein each test command of the plurality of test commands tests a movement control model;

translating, using one or more movement control models, the plurality of test commands into a plurality of sets of test movement instructions for the unmanned vehicle;

formatting the plurality of sets of the test movement instructions according to a communication protocol associated with the unmanned vehicle; and transmitting the plurality of sets of the test movement instructions formatted according to the communication protocol to the unmanned vehicle.

16. The non-transitory, computer-readable medium of claim 15, wherein the instructions further cause the one or more processors to perform operations comprising:

receiving, from the unmanned vehicle, position information resulting from execution of the plurality of sets of the test movement instructions;

determining, based on the one or more movement control models, expected position information associated with the unmanned vehicle; and determining, based on the expected position information and the position information from the unmanned vehicle, whether the plurality of sets of the test movement instructions moved the unmanned vehicle into an expected position.

17. The non-transitory, computer-readable medium of claim 13, wherein the instructions further cause the one or more processors to perform operations comprising:

receiving, from the unmanned vehicle, payload orientation information resulting from execution of a set of instructions for moving a payload device;

determining, based on a payload movement control model, expected orientation information associated with the payload device; and determining, based on the expected orientation information and the payload orientation information from the unmanned vehicle, whether the set of instructions moved the payload device into an expected orientation.

18. The non-transitory, computer-readable medium of claim 13, wherein the instructions for determining the plurality of movement control models further cause the one or more processors to perform operations comprising:

receiving, from the unmanned vehicle, a plurality of supported movement commands;

matching the plurality of supported movement commands with the plurality of movement control models; and assigning, to an unmanned vehicle object, the plurality of movement control models that match the plurality of supported movement commands.

19. The non-transitory, computer-readable medium of claim 18, wherein the instructions further cause the one or more processors to perform operations comprising:

determining that a first movement control model matches a first portion of the plurality of supported movement commands and a second movement control model matches a second portion of the plurality of supported movement commands; and generating a new movement control model comprising a first application programming interface for the first portion of the plurality of supported movement commands and a second application programming interface for the second portion of the plurality of supported movement commands.

20. The non-transitory, computer-readable medium of claim 13, wherein the instructions further cause the one or more processors to perform operations comprising:

receiving, from the unmanned vehicle, a plurality of supported payload commands;

matching the plurality of supported payload commands with one or more payload movement control models; and assigning, to an unmanned vehicle object, the one or more payload movement control models that match the plurality of supported payload commands.

* * * * *